United States Patent
Thangarasa et al.

(10) Patent No.: US 10,798,600 B2
(45) Date of Patent: Oct. 6, 2020

(54) ADAPTING D2D OPERATION ON NON-SERVING CARRIER FREQUENCY

(71) Applicant: TELEFONAKTIEBOLAGET L M ERICSSON (PUBL), Stockholm (SE)

(72) Inventors: Santhan Thangarasa, Vällingby (SE); Muhammad Kazmi, Sundbyberg (SE); Marco Belleschi, Solna (SE); Mats Folke, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/773,113

(22) PCT Filed: Nov. 2, 2016

(86) PCT No.: PCT/IB2016/056590
§ 371 (c)(1),
(2) Date: May 2, 2018

(87) PCT Pub. No.: WO2017/077463
PCT Pub. Date: May 11, 2017

(65) Prior Publication Data
US 2018/0324621 A1 Nov. 8, 2018

Related U.S. Application Data

(60) Provisional application No. 62/249,767, filed on Nov. 2, 2015.

(51) Int. Cl.
*H04W 24/10* (2009.01)
*H04W 56/00* (2009.01)
(Continued)

(52) U.S. Cl.
CPC ......... *H04W 24/10* (2013.01); *H04W 56/001* (2013.01); *H04W 76/14* (2018.02); *H04W 76/28* (2018.02)

(58) Field of Classification Search
CPC . H04W 24/10; H04W 64/00; H04W 36/0094; H04W 4/023; H04W 72/0446;
(Continued)

(56) References Cited

U.S. PATENT DOCUMENTS

2013/0295958 A1* 11/2013 Siomina ................ G01S 5/0205
455/456.1
2015/0245394 A1 8/2015 Sharma
2018/0302779 A1* 10/2018 Fujishiro ................ H04W 8/00

FOREIGN PATENT DOCUMENTS

| EP | 3065480 A1 | 9/2016 |
| JP | 2016/021653 A1 | 11/2016 |
| WO | 2015065109 A1 | 5/2015 |

OTHER PUBLICATIONS

Qualcomm Incorporated, "Running stage 2 CR TS 36.300 to capture agreement on eD2D", 3GPP TSG-RAN WG2 #91Bis; R2-154899; Oct. 5-9, 2015.
(Continued)

*Primary Examiner* — Awet Haile

(57) ABSTRACT

Systems and methods are disclosed herein that relate to configuration of measurements gaps to be applied by a wireless device for a non-serving carrier on which the wireless device intended or is expected to perform Device-to-Device (D2D) operations. In some embodiments, a method of operation of a network node comprises determining whether a wireless device that is configured with a serving cell that operates on a first frequency is synchronized to a non-serving cell that operates on a second frequency, which is a non-serving frequency. The method further comprises determining whether to configure the wireless device to apply a first or second measurement gap configuration based upon whether the wireless device is synchronized to the non-serving cell and transmitting information to the wireless device that configures the wireless (Continued)

device to apply the determined measurement gap configuration.

16 Claims, 9 Drawing Sheets

(51) Int. Cl.
*H04W 76/14* (2018.01)
*H04W 76/28* (2018.01)

(58) Field of Classification Search
CPC . H04W 72/12; H04W 56/001; H04W 72/042; H04W 72/0453; H04W 72/1268; H04W 76/28; H04L 5/0048; H04L 5/0092; H04L 5/001; H04L 5/0091; Y02D 70/24; Y02D 70/21
See application file for complete search history.

(56) References Cited

OTHER PUBLICATIONS

Qualcomm Incorporated, "Discussion on LS on Gap handling for Sidelink Discovery", 3GPP TSG-RAN WG4 Meeting #76bis; R4-155557; Oct. 12-16, 2015.

RAN2, "3GPP TSG-RAN WG2 Meeting #91; R2-153983; LS on gap handling for sidelink discovery", 3GPP Draft; R2-153983 LS on Gap Handling for Discovery, 3rd Generation Partnership Project(3GPP), Mobile Competence Centre, Sep. 5, 2015.

RAN4, "3GPP TSG-RAN WG4 Meeting #76bis; R4-156631; Reply LS on gap handling for sidelink discovery", 3GPP Draft; R4-156631, 3rd Generation Partnership Project(3GPP), Mobile Competence Centre, Oct. 16, 2015.

Ericsson, "3GPP TSG-RAN WG4 Meeting #77; R4-157731; Synchronization overhead for D2D Discovery operation on non-serving carrier", 3GPP Draft; R4-157731, 3rd Generation Partnership Project (3GPP), Mobile Competence Centre, Nov. 9, 2015.

Qualcomm Incorporated, "3GPP TSG RAN Meeting #67; Revised WI: Enhanced LTE Device to Device Proximity Services", RP-150441, 3rd Generation Partnership Project (3GPP), Mar. 9-12, 2014.

Ericsson, "Analysis of gap handling for D2D discovery", 3GPP TSG-RAN WG4 Meeting # 76bis, R4-156310; Oct. 12-16, 2015.

* cited by examiner

ADAPTING D2D OPERATION ON NON-SERVING CARRIER FREQUENCY

RELATED APPLICATIONS

This application is a national stage application of International Patent Application No. PCT/IB2016/056590, filed Nov. 2, 2016, which claims the benefit of provisional patent application Ser. No. 62/249,767, filed Nov. 2, 2015, the disclosures of which are hereby incorporated herein by reference in their entireties.

TECHNICAL FIELD

The disclosed subject matter relates generally to telecommunications, and more particularly to techniques and technologies for adapting Device-to-Device (D2D) operation on a non-serving carrier frequency.

BACKGROUND

User Equipment (UE) Measurements

Radio measurements performed by a UE, which is also referred to herein as a User Equipment device or more generally as a wireless device, are typically performed on a serving cell and neighbor cells over some known reference symbols or pilot sequences. The measurements are performed on cells on an intra-frequency carrier and inter-frequency carrier(s) as well as on inter-Radio Access Technology (RAT) carriers(s), depending upon which UE supports that RAT. To enable inter-frequency and inter-RAT measurements for the UE requiring measurement gaps, the network must configure the measurement gaps.

Measurements can be done for various purposes. Some example measurement purposes are: mobility, positioning, Self-Organizing Network (SON), Minimization of Drive Tests (MDT), Operation and Maintenance (O&M), network planning and optimization, etc. Examples of measurements in Third Generation Partnership Project (3GPP) Long Term Evolution (LTE) are cell identification aka Physical Cell Identity (PCI) acquisition, Reference Symbol Received Power (RSRP), Reference Symbol Received Quality (RSRQ), Cell Global Identity (ID) (CGI) acquisition, Reference Signal Time Difference (RSTD), UE Reception-Transmission (RX-TX) time difference measurement, Radio Link Monitoring (RLM), which comprises Out of Synchronization (out of sync) detection and In Synchronization (in-sync) detection, etc. Channel State Information (CSI) measurements performed by the UE are used by the network for scheduling, link adaptation, etc. Examples of CSI measurements or CSI reports are Channel Quality Indicator (CQI), Precoding Matrix Indicator (PMI), Rank Indicator (RI), etc. CSI measurements may be performed on reference signals like Common Reference Signal (CRS), CSI Reference Signal (CSI-RS), or Demodulation Reference Signal (DMRS). Measurements are done in all Radio Resource Control (RRC) states, i.e. in RRC idle and connected states.

Within the 3GPP LTE downlink radio frame structure, downlink subframe #0 and downlink subframe #5 carry synchronization signals, i.e., both the Primary Synchronization Signal (PSS) and the Secondary Synchronization Signal (SSS). To identify an unknown cell such as, e.g., new neighbor cell, the UE has to acquire the timing of that cell and eventually the PCI of that cell. This is called as cell search or cell identification. Subsequently, the UE also measures RSRP and/or RSRQ of the newly identified cell to use itself and/or report to the network node. In total, there are 504 PCIs. The cell search is also a type of measurement.

Radio Network Node Measurements

To support different functions such as mobility (e.g., cell selection, handover, etc.), positioning a UE, link adaption, scheduling, load balancing, admission control, interference management, interference mitigation, etc., a radio network node also performs radio measurements on signals transmitted and/or received by the radio network node. Examples of such measurements are Signal to Noise Ratio (SNR), Signal to Interference plus Noise Ratio (SINR), Received Interference Power (RIP), Block Error Rate (BLER), propagation delay between the UE and itself, transmit carrier power, transmit power of specific signals (e.g., TX power of reference signals), positioning measurements like Timing Advance (TA), enhanced or evolved Node B (eNB) RX-TX time difference, etc.

Cell Search

Downlink subframe #0 and downlink subframe #5 carry synchronization signals, i.e. both PSS and SSS. To identify an unknown cell such as, e.g., a new neighbor cell, the UE has to acquire the timing of that cell and eventually the PCI of that cell. Subsequently the UE also measures RSRP and/or RSRQ of the newly identified cell to use itself and/or report the measurement to the network node. In total there are 504 PCIs.

Therefore, the UE searches or identifies a cell (i.e., acquires the PCI of the cell) by correlating the received PSS/SSS signals in downlink subframe #0 and/or in downlink subframe #5 with one or more of the predefined PSS/SSS sequences. The use of downlink subframe #0 and/or downlink subframe #5 for PCI acquisition depends upon implementation. The UE regularly attempts to identify neighbor cells on at least the serving carrier frequency(ies) of the UE. But the UE may also search cells on non-serving carrier(s) when configured by the network node to do so. To save UE power consumption, typically, the UE searches in one of the downlink subframes #0 and #5. To further save its battery power, the UE searches the cell once every 40 milliseconds (ms) in non-Discontinuous Reception (DRX) or in short DRX cycle (e.g., up to 40 ms). When using a longer DRX cycle, the UE typically searches a cell once every DRX cycle. During each search attempt, the UE typically stores a snapshot of 5-6 ms of the received signals and post processes the stored received signals by correlating the stored received signals with the known PSS/SSS sequences. In non-DRX, the UE is able to identify an intra-frequency cell, including RSRP/RSRQ measurements, within 800 ms (i.e., 20 attempts in total including 15 and 5 samples for cell identification (PCI acquisition) and RSRP/RSRQ measurement, respectively).

Device-to-Device (D2D) Operation and D2D Communication in LTE

D2D communications enable devices in proximity of each other to communicate in a peer-to-peer (direct) fashion rather than communicating through some wireless access point or base station. In practice, D2D UEs in the 3GPP LTE system utilize the cellular uplink spectrum, i.e., they transmit D2D signals or channels in the uplink part of the spectrum.

According to the conventional approaches, D2D operation by a UE is in a half-duplex mode, i.e. the UE can either transmit D2D signals/channels or receive D2D signals/ channels. There may also be D2D relay UEs that may relay some signals to other D2D UEs. There is also control information for D2D, some of which is transmitted by D2D UEs and the rest (e.g., D2D resource grants for D2D communication transmitted via cellular downlink control channels) is transmitted by the base stations, or eNBs. The D2D transmissions may occur on resources which are configured by the network or selected autonomously by the D2D UE.

Specifically in LTE, D2D communication implies that a D2D transmitter transmits D2D data and D2D communication control information with Scheduling Assignments (SAs) to assist receivers of the D2D data, which are referred to as D2D receivers. The D2D data transmissions are according to configured patterns and, in principle, may be transmitted rather frequently. Scheduling assignments are transmitted periodically. D2D transmitters that are within network coverage may request eNB resources for their D2D communication transmissions and, in response, receive D2D resource grants for SA and D2D data. Furthermore, the eNB may broadcast D2D resource pools for D2D communication.

D2D discovery messages are transmitted in infrequent periodic subframes. eNBs may broadcast D2D resource pools for D2D discovery, both for reception and transmission.

In LTE, D2D communication supports two different modes of D2D operation: mode 1 and mode 2. In mode 1, the location of the resources for transmission of the scheduling assignment by the broadcasting UE comes from the eNB. The location of the resource(s) for transmission of the D2D data by the broadcasting UE comes from the eNB. In mode 2, a resource pool for scheduling assignment is preconfigured and/or semi-statically allocated. The UE, on its own, selects the resource for scheduling assignment from the resource pool for scheduling assignment to transmit its scheduling assignment.

Primary Cell (PCell) interruption of one (1) subframe occurs when the UE switches its reception between D2D-to-Wireless Access Network (WAN) or WAN-to-D2D, where here WAN refers to the cellular network. This is because the UE receiver chain needs to be retuned every time the operation is switched from WAN to D2D reception and from D2D to WAN reception. This applies to both D2D discovery and D2D communication capable UEs. It is important to partition uplink resources between cellular uplink and D2D operation in such a way that avoids or minimizes the risk of switching taking place in certain subframes, i.e., subframe #0 and/or #5, of the PCell. These subframes contain essential information such as PSS/SSS that are necessary for performing cell search and carrying out cell measurements, and they also contain Master Information Block (MIB)/System Information Block type 1 (SIB1) information, which is necessary for System Information (SI) reading procedures. In addition to interruption that takes place due to switching, there may be an additional interruption of one (1) subframe due to the RRC reconfiguration procedure. While the switching interruption takes place for single receiving UE (e.g., D2D discovery capable UEs), the RRC reconfiguration interruption takes place for all types of D2D UEs (e.g., D2D Discovery capable and D2D Communication capable).

D2D operation is a generic term which may comprise transmission and/or reception of any type of D2D signals (e.g., physical signals, physical channel, etc.) by a D2D communication capable UE and/or by a D2D discovery capable UE. D2D operation is therefore also referred to herein as D2D transmission, D2D reception, D2D communication, etc.

A D2D UE is also interchangeably referred to herein as a Proximity Services (ProSe) capable UE. Similarly, D2D operation is also interchangeably referred to herein as ProSe operation. A D2D discovery capable UE is also referred to herein as a UE capable of ProSe direct discovery, and a D2D direct communication UE is also referred to as a UE capable of ProSe direct communication. D2D operation may also interchangeably be referred to herein as ProSe operation. The link and/or carrier that is used for the ProSe direct communication and ProSe direct discovery between UEs is referred to herein as a sidelink. The ProSe operation performed by the UE may broadly comprise of ProSe reception (i.e., receiving ProSe signals) and/or ProSe transmission (i.e., transmitting ProSe signals). Vehicle to X (V2X) operation is another variant of D2D operation. V2X enables communication between a vehicle and any one or more of another vehicle, infrastructure, and a pedestrian. Therefore, X may denote 'vehicular' (aka V2V) or X may denote 'pedestrian' (aka V2P) or X may denote 'infrastructure' (aka V2I), and so on. The embodiments are applicable for any type of D2D operation including ProSe, V2X, and so on.

SUMMARY

Systems and methods are disclosed herein that relate to configuration of measurements gaps to be applied by a wireless device for a non-serving carrier on which the wireless device intended or is expected to perform Device-to-Device (D2D) operations. In some embodiments, a method of operation of a network node in a cellular communications network comprises determining whether a wireless device that is configured with a serving cell that operates on a first frequency is synchronized to a non-serving cell that operates on a second frequency, where the second frequency is a non-serving frequency, e.g., that the wireless device intends or is expected to use for a D2D operation. The method further comprises determining whether to configure the wireless device to apply a first measurement gap configuration or a second measurement gap configuration based upon whether the wireless device is synchronized to the non-serving cell that operates on the second frequency, the first measurement gap configuration and the second measurement gap configuration being different measurement gap configurations. The method further comprises transmitting information to the wireless device that configures the wireless device to apply the first measurement gap configuration or the second measurement gap configuration as determined by the network node. In this manner, if, for example, the wireless device is determined to not be synchronized to the non-serving cell on the second carrier, the wireless device can be configured with a longer, or extended, measurement gap to provide the wireless device with additional time to synchronize to the non-serving cell on the second carrier before performing the D2D operation remainder of the configured measurement gap.

In some embodiments, the method further comprises adapting scheduling of signals to the wireless device based on whether the wireless device is configured with the first measurement gap configuration or the second measurement gap configuration.

In some embodiments, determining whether to configure the wireless device to apply the first measurement gap configuration or the second measurement gap configuration comprises determining to configure the wireless device to apply the first measurement gap configuration upon determining that the wireless device is synchronized to the non-serving cell that operates on the second frequency and determining to configure the wireless device to apply the second measurement gap configuration upon determining that the wireless device is not synchronized to the non-serving cell that operates on the second frequency.

In some embodiments, the method further comprises determining whether the wireless device needs to obtain system information from the non-serving cell that operates on the second frequency. Further, determining whether to configure the wireless device to apply the first measurement gap configuration or the second measurement gap configuration comprises determining to configure the wireless device to apply the first measurement gap configuration upon determining that the wireless device is synchronized to the non-serving cell that operates on the second frequency and does not need to obtain system information from the non-serving cell that operates on the second frequency and determining to configure the wireless device to apply the second measurement gap configuration upon determining that the wireless device is not synchronized to the non-serving cell that operates on the second frequency and/or needs to obtain system information from the non-serving cell that operates on the second frequency.

In some embodiments, the first measurement gap configuration comprises a first measurement gap duration, the second measurement gap configuration comprises a second measurement gap duration, and the second measurement gap duration is greater than the first measurement gap duration. Further, in some embodiments, the second measurement gap duration comprises the first measurement gap duration plus an extension, wherein the extension is a variable. In other embodiments, the second measurement gap duration comprises the first measurement gap duration plus an extension, wherein the extension is a function of at least one of a group consisting of: whether the wireless device needs to acquire system information from the non-serving cell, a number of system information blocks that the wireless device needs to acquire from the non-serving cell, whether the wireless device needs to acquire paging from the non-serving cell, and whether the non-serving cell has previously been known to the wireless device. In some other embodiments, the second measurement gap duration comprises the first measurement gap duration plus an extension, wherein the extension is a predefined variable.

In some embodiments, the method further comprises determining whether the wireless device needs to obtain system information from the non-serving cell that operates on the second frequency. Further, determining whether to configure the wireless device to apply the first measurement gap configuration or the second measurement gap configuration comprises determining whether to configure the wireless device to apply the first measurement gap configuration or the second measurement gap configuration based upon whether the wireless device is synchronized to the non-serving cell that operates on the second frequency and whether the wireless device needs to obtain system information from the non-serving cell that operates on the second frequency.

In some embodiments, determining whether to configure the wireless device to apply the first measurement gap configuration or the second measurement gap configuration comprises, if a certainty of whether the wireless device is synchronized to the non-serving cell that operates on the second frequency is less than a threshold, determining to configure the wireless device to periodically apply the second measurement gap configuration and otherwise apply the first measurement gap configuration.

In some embodiments, determining whether the wireless device is synchronized to the non-serving cell that operates on the second frequency comprises determining whether the wireless device is synchronized to the non-serving cell that operates on the second frequency based on at least one of: a timing accuracy of the wireless device on the non-serving cell; a speed of the wireless device in relation to the non-serving cell; a location of the wireless device in relation to the non-serving cell; historical data on activity of the wireless device; whether the wireless device is operating in an idle state or in connected state; a radio resource control state of the wireless device; whether the wireless device is operating in a Discontinuous Reception (DRX) mode of operation; an amount of time that has elapsed since the wireless device was last configured with a measurement gap configuration; an amount of time that has elapsed since the wireless device was last configured with the second measurement gap configuration; information received from one or more other nodes in the cellular communications network; and an implicit or explicit indication of synchronization status of the wireless device with respect to the non-serving cell received from the wireless device.

Embodiments of a network node for a cellular communications network are also disclosed. In some embodiments, a network node for a cellular communications network is adapted to determine whether a wireless device that is configured with a serving cell that operates on a first frequency is synchronized to a non-serving cell that operates on a second frequency, where the second frequency is a non-serving frequency, e.g., that the wireless device intends or is expected to use for a D2D operation. The network node is further adapted to determine whether to configure the wireless device to apply a first measurement gap configuration or a second measurement gap configuration based upon whether the wireless device is synchronized to the non-serving cell that operates on the second frequency, where the first measurement gap configuration and the second measurement gap configuration are different measurement gap configurations. The network node is further adapted to transmit information to the wireless device that configures the wireless device to apply the first measurement gap configuration or the second measurement gap configuration as determined by the network node. In some embodiments, the network node is further adapted to operate according to any one of the embodiments of the method of operation of a network node disclosed herein.

In some embodiments, a network node for a cellular communications network comprises a processor and memory comprising instructions executable by the processor whereby the network node operates as follows. The network node determines whether a wireless device that is configured with a serving cell that operates on a first frequency is synchronized to a non-serving cell that operates on a second frequency, where the second frequency is a non-serving frequency, e.g., that the wireless device intends or is expected to use for a D2D operation. The network node determines whether to configure the wireless device to apply a first measurement gap configuration or a second measurement gap configuration based upon whether the wireless device is synchronized to the non-serving cell that operates on the second frequency, where the first measurement gap configuration and the second measurement gap configuration are different measurement gap configurations. The network node further operates to transmit information to the wireless device that configures the wireless device to apply the first measurement gap configuration or the second measurement gap configuration as determined by the network node.

In some embodiments, a network node for a cellular communications network comprises a first determining module, a second determining module, and a transmitting module. The first determining module is operable to determine whether a wireless device that is configured with a serving cell that operates on a first frequency is synchronized to a non-serving cell that operates on a second frequency, where the second frequency is a non-serving frequency, e.g., that the wireless device intends or is expected to use for a D2D operation. The second determining module is operable to determine whether to configure the wireless device to apply a first measurement gap configuration or a second measurement gap configuration based upon whether the wireless device is synchronized to the non-serving cell that operates on the second frequency, where the first measurement gap configuration and the second measurement gap configuration are different measurement gap configurations. The transmitting module is operable to transmit information to the wireless device that configures the wireless device to apply the first measurement gap configuration or the second measurement gap configuration as determined by the network node.

Embodiments of a method of operation of a wireless device in a cellular communications network are also disclosed. In some embodiments, a method of operation of a wireless device in a cellular communications network comprises obtaining first information for determining whether the wireless device that is configured with a serving cell that operates on a first frequency is synchronized to a non-serving cell that operates on a second frequency, where the second frequency is a non-serving frequency, e.g., that the wireless device intends or is expected to use for a D2D operation. The method further comprises determining whether the wireless device is synchronized to the non-serving cell that operates on the second frequency based on the first information and, upon determining that the wireless device is not synchronized to the non-serving cell that operates on the second frequency, transmitting a request to a network node. The request comprises at least one of an indication that the wireless device is not synchronized to the non-serving cell that operates on the second frequency, an indication that the wireless device needs an extended measurement gap in order to synchronize to the non-serving cell before performing a D2D operation, and a duration of an extended gap requested by the wireless device for synchronizing to the non-serving cell in order to perform a D2D operation.

In some embodiments, the method further comprises receiving, in response to the request, second information from the network node, where the second information comprises a measurement gap configuration for the wireless device. The measurement gap configuration comprises a configuration for an extended measurement gap where the extended measurement gap is a measurement gap having a duration that comprises a measurement gap extension in which the wireless device synchronizes to the non-serving cell plus a measurement gap duration in which the wireless device can perform a D2D operation. The method further comprises configuring a measurement gap configuration applied by the wireless device in accordance with the second information and, during a measurement gap having the configured measurement gap duration, synchronizing to the non-serving cell that operates on the second frequency and performing a D2D operation on the non-serving cell that operates on the second frequency.

In some embodiments, the method further comprises adapting a measurement gap configuration of the wireless device.

In some embodiments, determining whether the wireless device is synchronized to the non-serving cell that operates on the second frequency comprises determining whether the wireless device is synchronized to the non-serving cell that operates on the second frequency based on at least one of: a timing accuracy of the wireless device on the non-serving cell, a speed of the wireless device in relation to the non-serving cell, a location of the wireless device in relation to the non-serving cell, historical data on activity of the wireless device, whether the wireless device is operating in an idle state or in connected state; a radio resource control state of the wireless device, whether the wireless device is operating in a DRX mode of operation, an amount of time that has elapsed since the wireless device was last configured with a measurement gap configuration, an amount of time that has elapsed since the wireless device was last configured with an extended measurement gap, and information received from one or more other nodes in the cellular communications network.

Embodiments of a wireless device for a cellular communications network are also disclosed. In some embodiments, a wireless device for a cellular communications network is adapted to obtain first information for determining whether the wireless device that is configured with a serving cell that operates on a first frequency is synchronized to a non-serving cell that operates on a second frequency, where the second frequency is a non-serving frequency, e.g., that the wireless device intends or is expected to use for a D2D operation. The wireless device is further adapted to determine whether the wireless device is synchronized to the non-serving cell that operates on the second frequency based on the first information and, upon determining that the wireless device is not synchronized to the non-serving cell that operates on the second frequency, transmit a request to a network node. The request comprises at least one of an indication that the wireless device is not synchronized to the non-serving cell that operates on the second frequency, an indication that the wireless device needs an extended measurement gap in order to synchronize to the non-serving cell before performing a D2D operation, and a duration of an extended gap requested by the wireless device for synchronizing to the non-serving cell in order to perform a D2D operation. In some embodiments, the wireless device is further adapted to operate according to any one of the embodiments of the method of operation of a wireless device disclosed herein.

In some embodiments, a wireless device for a cellular communications network comprises a transceiver, a processor, and memory comprising instructions executable by the processor whereby the wireless device is operable to operate as follows. The wireless device obtains first information for determining whether the wireless device that is configured with a serving cell that operates on a first frequency is synchronized to a non-serving cell that operates on a second frequency, where the second frequency is a non-serving frequency, e.g., that the wireless device intends or is expected to use for a D2D operation. The wireless device further operates to determine whether the wireless device is synchronized to the non-serving cell that operates on the second frequency based on the first information and, upon determining that the wireless device is not synchronized to the non-serving cell that operates on the second frequency, transmit a request to a network node. The request comprises at least one of an indication that the wireless device is not synchronized to the non-serving cell that operates on the second frequency, an indication that the wireless device needs an extended measurement gap in order to synchronize to the non-serving cell before performing a D2D operation, and a duration of an extended gap requested by the wireless device for synchronizing to the non-serving cell in order to perform a D2D operation.

In some embodiments, a wireless device for a cellular communications network comprises an obtaining module, a determining module, and a transmitting module. The obtaining module is operable to obtain first information for determining whether the wireless device that is configured with a serving cell that operates on a first frequency is synchronized to a non-serving cell that operates on a second frequency, where the second frequency is a non-serving frequency, e.g., that the wireless device intends or is expected to use for a D2D operation. The determining module is operable to determine whether the wireless device is synchronized to the non-serving cell that operates on the second frequency based on the first information. The transmitting module is operable to, upon determining, by the determining module, that the wireless device is not synchronized to the non-serving cell that operates on the second frequency, transmit a request to a network node. The request comprises at least one of an indication that the wireless device is not synchronized to the non-serving cell that operates on the second frequency, an indication that the wireless device needs an extended measurement gap in order to synchronize to the non-serving cell before performing a D2D operation, and a duration of an extended gap requested by the wireless device for synchronizing to the non-serving cell in order to perform a D2D operation.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure. The drawings illustrate selected embodiments of the disclosed subject matter. In the drawings, like reference labels denote like features.

DETAILED DESCRIPTION

Figure 1:
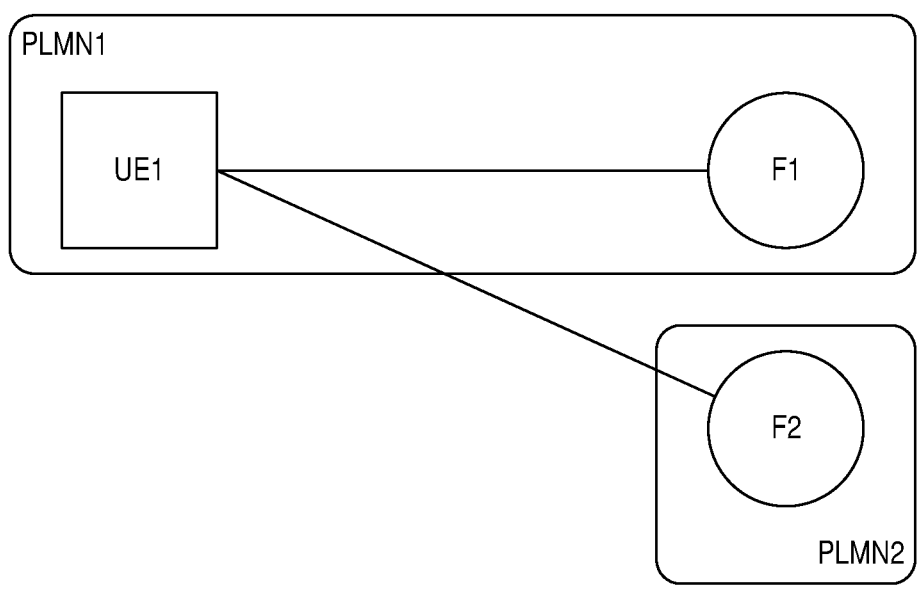
FIG. 1 illustrates an example of communications in a non-serving carrier, e.g. inter-Public Land Mobile Network (PLMN) communications.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In some embodiments a general term "network node" is used and it can correspond to any type of radio network node or any network node, which communicates with a User Equipment device (UE) and/or with another network node. Examples of network nodes are a Node B, a Master enhanced or evolved Node B (MeNB), a Secondary enhanced or evolved Node B (SeNB), a network node belonging to a Master Cell Group (MCG) or Secondary Cell Group (SCG), a base station, a Multi-Standard Radio (MSR) radio node such as a MSR base station, an enhanced or evolved Node B (eNB), a network controller, a Radio Network Controller (RNC), a Base Station Controller (BSC), a relay, a donor node controlling relay, a Base Transceiver Station (BTS), an Access Point (AP), transmission points, transmission nodes, a Remote Radio Unit (RRU), a Remote Radio Head (RRH), nodes in a Distributed Antenna System (DAS), a core network node (e.g., a Mobile Switching Center (MSC), a Mobility Management Entity (MME), etc.), Operations and Maintenance (O&M), an Operations Support System (OSS), a Self-Organizing Network (SON), a positioning node (e.g., an Evolved Serving Mobile Location Center (E-SMLC)), Minimization of Drive Test (MDT), etc.

In some embodiments the non-limiting term UE is used and it refers to any type of wireless device communicating with a network node and/or with another UE in a cellular or mobile communication system. Examples of a UE are a target device, a Device-to-Device (D2D) UE, a machine type UE or a UE capable of Machine-to-Machine (M2M) communication, a Personal Digital Assistant (PDA), a tablet, a mobile terminal, a smart phone, Laptop Embedded Equipment (LEE), Laptop Mounted Equipment (LME), Universal Serial Bus (USB) dongles, etc.

Certain embodiments are described in relation to Long Term Evolution (LTE). However the described embodiments may be applicable to any Radio Access Technology (RAT) or multi-RAT systems, where the UE receives and/or transmit signals (e.g., data) e.g. LTE Frequency Division Duplexing (FDD)/Time Division Duplexing (TDD), Wideband Code Division Multiple Access (WCDMA)/High Speed Pack Access (HSPA), Global System for Mobile communications (GSM)/GSM Enhanced Data Rates for Global Evolution (EDGE) Radio Access Network (GERAN), Wi-Fi, Wireless Local Area Network (WLAN), Code Division Multiple Access 2000 (CDMA2000), etc.

Up to now, procedures, requirements, and support for D2D operation exist only for operation on a Primary Cell (PCell). There is no procedure or requirements defined for how D2D operation can be operated on a non-serving carrier of a UE. The non-serving carrier can and may have different timing than a carrier on which the serving cell, e.g. PCell, Secondary Cell (SCell), Primary SCell (PSCell), etc., of the UE operates. For example, the transmit timing of the non-serving carrier can be shifted by one or more time units or time resources with respect to the timing of the one or more serving cells of the UE or may be arbitrary with respect to the transmit timing of the one or more serving cells of the UE. Examples of a time unit or time resource are symbols, time slot or subframe, frame, etc. Also, the serving cell and the cell on the non-serving carrier (i.e., the non-serving cell) may not be located at the same location. In other words, the serving cell and the non-serving cell may be served by radio access nodes that are at different geographic locations. This also results in different times of arrival of signals at the UE from the serving cell and the cell on the non-serving carrier. D2D communication is typically operated on the uplink resources of the cellular communications network, i.e. the sidelink resources are configured on the carrier in a FDD system or on uplink subframes in a TDD system. Therefore, the UE needs to acquire the timing of the carrier on which D2D operation takes place (i.e., the uplink carrier) and synchronize its receiver/transmitter in both time and frequency to transmit/receive D2D signals on that carrier. The uplink transmit timing of the uplink signals on the uplink carrier is derived by the UE based on the downlink reception timing of the downlink signals received on the corresponding downlink carrier.

Therefore, in order to perform Proximity Services (ProSe) (i.e., D2D) operation on a non-serving carrier (i.e., on uplink resources), the UE needs to first detect a cell on the non-serving carrier and then synchronize to that carrier. The cell detection procedure may include acquisition of the Primary Synchronization Signal (PSS)/Secondary Synchronization Signal (SSS) and/or Primary Sidelink Synchronization Signal (PSSS)/Secondary Sidelink Synchronization Signal (SSSS) to acquire the Physical Cell Identity (PCI) of the cell or any other synchronization references on that carrier. Thereafter, the UE needs to synchronize in both time and frequency to align its time and frequency tracking function before it can start transmitting or receiving on that carrier. For this, the UE needs to measure on the downlink subframes to adjust its time and frequency loops, allow time for Amplitude Gain Control (AGC) settling, time- and frequency tracking loops, etc.

The UE whose serving carrier is different than the carrier on which it intends to perform ProSe cannot perform the synchronization procedure as described above because it is a different carrier than its serving carrier. Therefore, the UE cannot measure and synchronize to that non-serving carrier, e.g. it can be an inter-frequency carrier. Today, no procedure exists for the UE to perform and maintain synchronization for D2D operation on a non-serving carrier. Without synchronization to the non-serving carrier, the UE is unable to operate (transmit or receive) on that carrier for D2D operation.

The above and other shortcomings of conventional technologies may be addressed by certain embodiments described below.

Certain embodiments apply to situations where a certain UE intends to operate (transmit or receive) on a carrier F2 that is not its serving carrier. This non-serving carrier F2 can belong to another operator, as depicted in the example of FIG. 1 where the non-serving carrier belongs to a different Public Land Mobile Network (PLMN), or it can be a carrier belonging to the same operator but not configured by the network to be a serving carrier for this UE, or it can even be an out-of-coverage carrier in which the UE is authorized to perform ProSe operations but not cellular operations. The non-serving carrier F2 can also be a dedicated carrier, e.g. a public safety carrier, in which the UE has been preconfigured to perform only certain operations for example for public safety purposes.

In all the above cases, regardless of the specific scenario, before transmitting/receiving, the UE must acquire synchronization signals from the non-serving carrier. The synchronization signals can be the PSS/SSS of a certain cell, or the PSSS/SSSS of another detected synchronization source, e.g. the PSSS/SSSS of another detected UE in case this UE is out-of-coverage in the non-serving carrier.

In the following, for simplicity, the disclosure refers to non-serving carrier transmission/reception in the field of ProSe direct discovery or ProSe direct communication specified by Third Generation Partnership Project (3GPP) in Release 12. However, the following embodiments can be easily generalized to other contexts, e.g. Vehicle to X (V2X), inter-PLMN communications, etc.

The described embodiments may be implemented in any appropriate type of communication system supporting any suitable communication standards and using any suitable components. As one example, certain embodiments may be implemented in an LTE network, such as that illustrated in FIG. 2.

Figure 2:
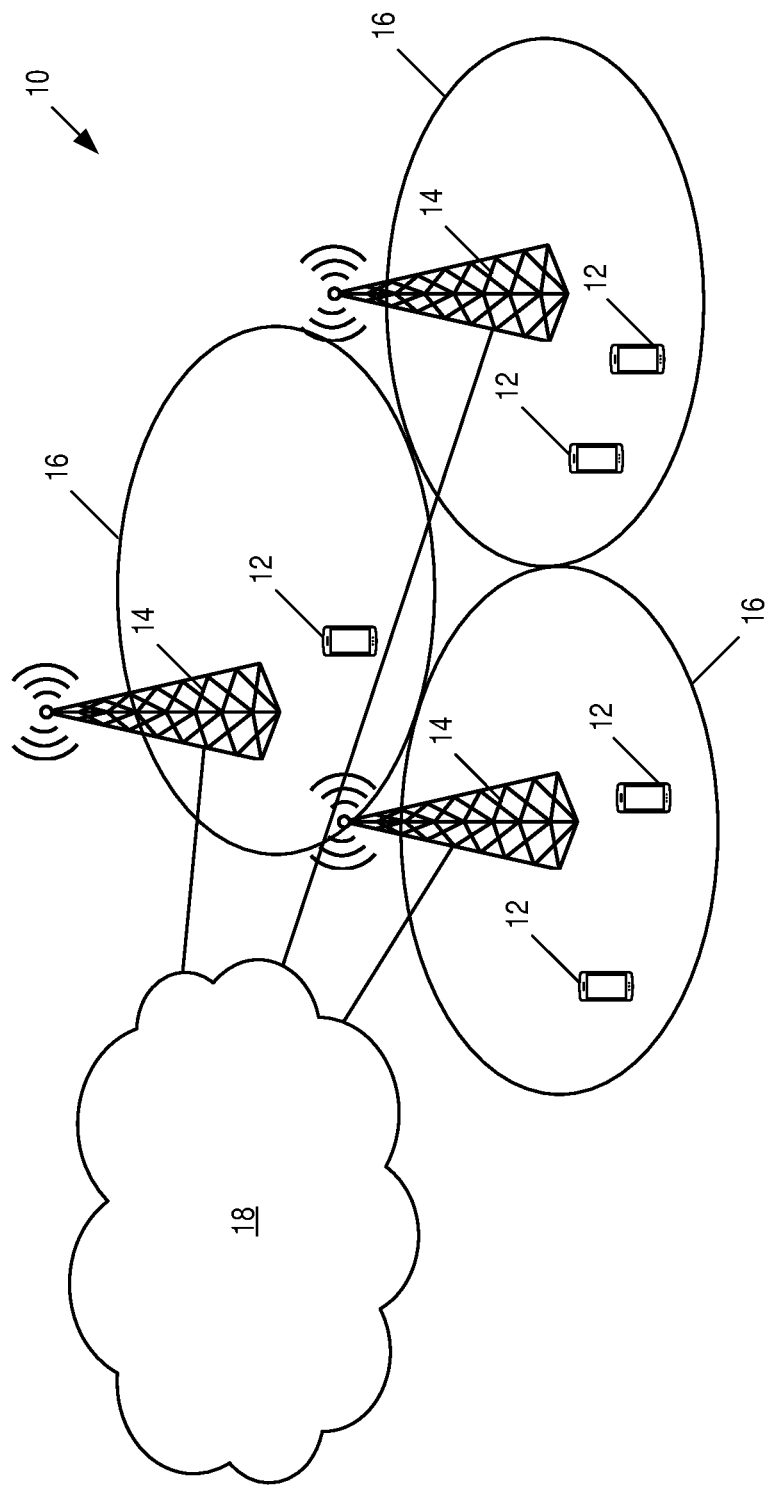
FIG. 2 is a diagram illustrating a Long Term Evolution (LTE) network, which is one example of a cellular communications network in which embodiments of the present disclosure may be implemented.

Referring to FIG. 2, a communication network 10 comprises a plurality of wireless communication devices 12 (e.g., conventional UEs or Machine Type Communication (MTC)/M2M UEs) and a plurality of radio access nodes 14 (e.g., eNBs or other base stations). The communication network 10 is organized into cells 16 served by the radio access nodes 14, where the cells 16 are connected to a core network 18 via the corresponding radio access nodes 14. The radio access nodes 14 are capable of communicating with the wireless communication devices 12 along with any additional elements suitable to support communication between wireless communication devices or between a wireless communication device and another communication device (such as a landline telephone). The communication network 10 is, in this example, an LTE network but may more generally be any type of cellular communications network. Thus, in this regard, the communication network 10 is also referred to herein as a cellular communications network 10. Similarly, the wireless communication devices 12 are, in some examples, UEs and, as such, the wireless communication devices 12 are sometimes referred to herein as UEs 12. Likewise, the radio access nodes 14 are, in some examples, eNBs and, as such, the radio access nodes 14 are sometimes referred to herein as eNBs 14.

Before describing embodiments of the present disclosure, a brief discussion of the general scenario to which embodiments of the present disclosure apply is beneficial. One example scenario comprises at least one network node (e.g., radio access node 14) serving a first cell, say a PCell which is also known as a serving cell. A D2D capable UE 12 can be preconfigured by the PCell with ProSe resources for ProSe operation of the D2D UE 12 on a sidelink. The preconfigured ProSe resources may in particular be used by the D2D UE 12 when operating in Out-of-Network-Coverage (ONC). The sidelink may typically operate on a carrier of the PCell, which is also known as a serving carrier frequency or intra-frequency carrier. The sidelink may also be configured for ProSe operation on a non-serving carrier of the D2D UE 12. The non-serving carrier can be an inter-frequency carrier, an inter-RAT carrier, or any carrier which is not configured as the serving carrier. For example, the non-serving carrier can be the one configured as inter-frequency carrier frequency for doing Wireless Access Network (WAN) measurements or carrier frequency only configured for doing ProSe operation.

In some embodiments, the D2D may also be configured with another cell that is configurable upon need basis, say a SCell SCell1. In some embodiments, the SCell1 may be served by a second network node (e.g., a second radio access node 14). The embodiments apply regardless of whether a PCell and one or more SCells are served by the same or different network nodes. In this case, the D2D UE 12 can be preconfigured with ProSe resources for ProSe operation on sidelink which may operate on the carrier of the PCell or on the carrier of the SCell or on the carrier of any non-serving carrier. The D2D UE 12 can be preconfigured with ProSe resources for ProSe operation on a plurality of sidelinks, e.g. carriers of PCell, SCell1, and a non-serving carrier.

The network node may also configure the D2D UE with a third cell, SCell2, on a different carrier on need basis. The embodiments presented in this disclosure may apply for a UE configured with Carrier Aggregation (CA) with any number of SCells.

In some embodiments, the UE may be configured with a PCell and a PSCell or with a PCell, a PSCell, and one or more SCells such as in dual connectivity. The configured cells are UE specific and the described embodiments may be applied on a UE basis on each configured cell.

The D2D UE 12 may also be configured with one or more carriers for doing measurements on the cells of the configured carriers. The UE 12 may be configured with such carriers for measuring in idle state and/or in connected state.

The UE 12 is configured with at least one serving cell (e.g., PCell) on carrier F1. Two example cases are: (1) the UE 12 intends to start ProSe (e.g., discovery) on uplink resources (e.g., sidelink) of at least one non-serving cell (cell2) on a non-serving carrier (F2) and (2) a network node (e.g., a radio access node 14) can request the UE 12 to start ProSe (e.g., discovery) on the uplink resources of cell2 on F2. In case (1), the UE 12 sends a request to the network node and in response the network node assigns gaps to the UE 12 for ProSe on the cell2 on F2. In case (2), the network node sends a request to the UE 12 to start ProSe on F2 using gaps, and also provides a gap configuration to the UE 12, etc.

The gaps may be periodic or aperiodic. The gaps may also be one shot, e.g. one gap is configured at the UE 12 at a time. During the gaps, the UE 12 is not required to receive and transmit signals in the serving cell. The gaps (i.e., cessation of serving cell operation) allow the UE 12 to reuse its resources (e.g., receiver, local oscillator, Radio Frequency (RF) components like power amplifier) for doing ProSe operation. Therefore, in the gaps, the UE 12 can receive and/or transmit ProSe signals on the non-serving cell. This configuration may be interchangeably called herein the first gap configuration.

Examples of gaps are periodic measurement gaps used by the UE 12 for doing UE measurements. The gaps are typically network node controlled, i.e. configured by the network node at the UE 12. More specifically, such periodic measurement gaps comprise a gap with gap length of 6 milliseconds (ms) occurring every 40 ms or 80 ms. The gap length may also be shorter or longer than 6 ms, e.g. it can be equal to the duration over which ProSe operation is to be performed by the UE. Examples of shorter gaps are 3 ms and longer gaps are 20 ms.

The gap configuration may also be expressed in terms of a bitmap, which can be signaled by the network node to the UE 12. The UE 12, upon receiving the gap configuration, creates the gaps based on the received information. The bitmap may be periodic or aperiodic. Examples of gaps expressed in terms of bitmap are:

{0000111110}, {0000000000}, {0000111110}, {0000000000}, . . . }; periodic bitmap with 5 subframe gap every second frame.

{0000111111}; periodic bitmap with a gap of 6 subframes.

In the above examples, bit '1' means a subframe with a gap and bit '0' means a subframe with serving cell operation.

Within each gap it may be assumed that one subframe is used for RF tuning from the serving to non-serving carriers and also 1 ms is used for RF tuning from the non-serving to serving carriers.

1 Method in a Network Node

Figure 3A:
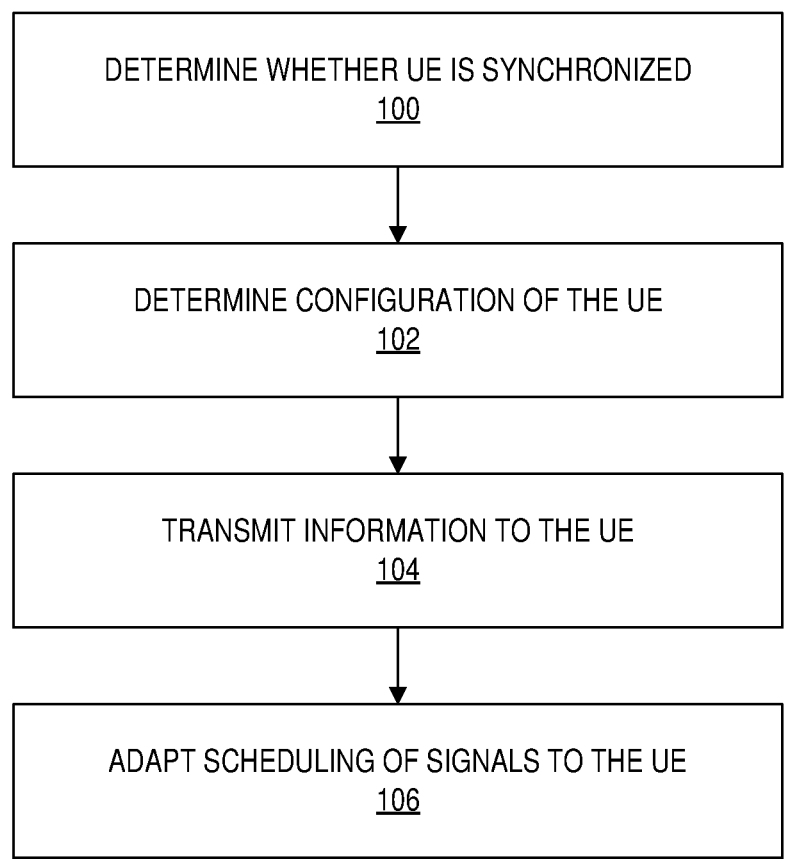
FIGS. 3A and 3B are flowcharts illustrating methods according to example embodiments.
Figure 3B:
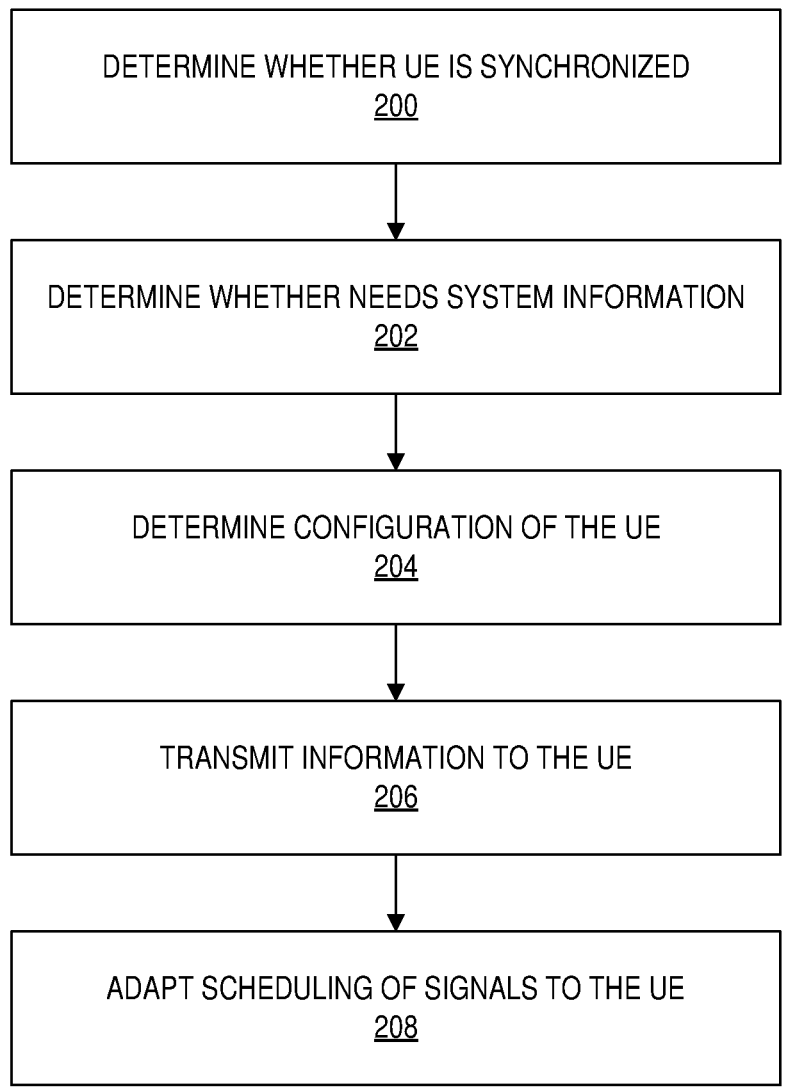
Figure 4:
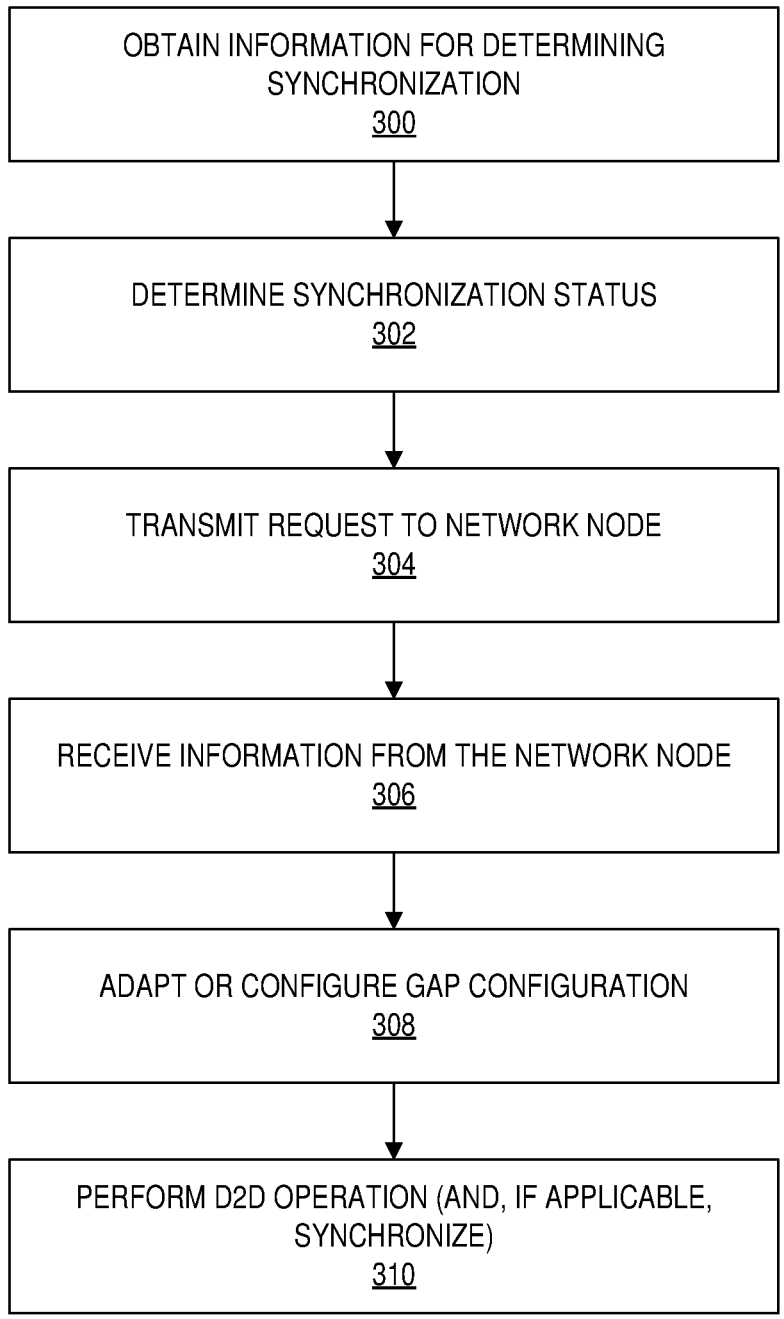
FIG. 4 is a flowchart illustrating a method according to another example embodiment.

FIGS. 3A and 3B as well as FIG. 4 illustrate certain example embodiments of the described subject matter. FIG. 3A illustrates a method in a network node (e.g., the radio access node or eNB 14) serving a ProSe capable UE 12. The method comprises the following:

Determining whether the UE 12 is synchronized to a second cell (cell2) on a non-serving carrier (F2) (step 100). In other words, the network node determines whether the UE 12, which is configured with a serving cell 16 that operates on a first frequency (F1), is synchronized to the non-serving or second cell (cell2) that operates on the non-serving or second frequency (F2). The second frequency is, e.g., a frequency that the UE 12 intends or is expected to use for D2D communication. The determination can be based on any of several factors such as, e.g.:

UE timing accuracy, speed of the UE 12, whether the UE 12 has performed any measurements on that cell 16 for the last T1 seconds, where T1 is a predefined or preconfigured threshold, information received from other network nodes, e.g. location server, etc., a Radio Resource Control (RRC) state of the UE 12, activity of the UE 12 including historical information, and/or recommendation or request from the UE 12.

Determining, based on the determined synchronization status of the UE 12 with respect to the non-serving cell (cell2), whether to configure the UE (step 102) with one of: a first gap configuration and a second gap configuration, for D2D operation, wherein the first gap configuration is used when the UE 12 is synchronized to the non-serving cell (cell2), and the second gap configuration is used when the UE 12 is not synchronized to the non-serving cell (cell2). For instance, the first gap configuration may only comprise the subframe(s) in which the UE 12 actually transmits/receives on the non-serving carrier and the subframes needed to tune/retune the Transmission/Reception (TX/RX) chain towards the non-serving carrier. The second gap configuration instead may add some subframes of overhead to the first gap configuration that are needed to acquire synchronization (or to read System Information (SI)/ paging, estimation Reference Signal Received Power (RSRP)) from the non-serving carrier. In other words, the network node determines whether to configure the UE 12 to apply the first measurement gap configuration or the second measurement gap configuration based upon whether the UE 12 is synchronized to the non-serving or second cell (cell2), where the first measurement gap configuration and the second measurement gap configuration are different measurement gap configurations.

Transmitting information to the UE 12 (step 104) regarding whether to apply the first or the second gap configurations, thereby enabling the UE 12 to perform at least D2D operation during at least part of the first or the second gap configurations. In other words, the network node transmits information to the UE 12 that configures the UE 12 to apply the first measurement gap configuration or the second measurement gap configuration as determined by the network node in step 102.

Adapting scheduling of signals to the UE 12 (step 106) during at least part of the configured gaps. For example, the network node may not schedule the UE 12 on any of the serving cells of the UE 12.

FIG. 3B illustrates a method in a network node (e.g., the radio access node or eNB 14) serving a ProSe capable UE 12 that is similar to that of FIG. 3A. The method comprises the following:

Determining whether the UE 12 is synchronized to a second cell (cell2) on a non-serving carrier (F2) (step 200). The second cell (cell2) is also referred to herein as the non-serving cell (cell2). In other words, the network node determines whether the UE 12, which is configured with a serving cell 16 that operates on a first frequency (F1), is synchronized to the non-serving or second cell (cell2) that operates on the non-serving or second frequency (F2). The second frequency is, e.g., a frequency that the UE 12 intends or is expected to use for D2D communication. The determination can be based on any of several factors such as, e.g.:

UE timing accuracy, speed of the UE 12, whether the UE 12 has performed any measurements on that cell 16 for the last T1 seconds, where T1 is a predefined or preconfigured threshold, information received from other network nodes, e.g. location server, etc., an RRC state of the UE 12, activity of the UE 12 including historical information, and/or recommendation or request from the UE 12.

Determining whether the UE 12 needs system information from the non-serving cell (cell2) on the non-serving carrier (F2) (step 202). This determination can be based on any of several factors. For example, in some embodiments, the network node determines when the UE 12 has to read system information messages depending on system information periodicity/paging cycle of the target cell or whether any system information change has occurred in the target cell, which would force the UE 12 in acquiring one or more System Information Blocks (SIBs) in the target cell.

Determining based on the determined synchronization status of the UE 12 with respect to the non-serving cell (cell2) and whether the UE 12 needs system information from the non-serving cell (cell2), whether to configure the UE 12 (step 204) with one of: a first gap configuration and a second gap configuration, for D2D operation, wherein the first gap configuration is used when the UE 12 is synchronized to the non-serving cell (cell2), and the second gap configuration is used when the UE 12 is not synchronized to the non-serving cell (cell2) and/or when the UE 12 need to acquire system information from the non-serving cell (cell2). For instance, the first gap configuration may only comprise the subframe(s) in which the UE 12 actually transmits/receives on the non-serving carrier and the subframes needed to tune/retune the TX/RX chain towards the non-serving carrier. The second gap configuration instead may add to the first gap configuration some subframes of overhead that are needed to acquire synchronization and/or read system information from the non-serving carrier. The second gap configuration may additionally or alternatively add some subframes of overhead that are needed for paging, estimation (e.g., RSRP), or the like. In other words, the network node determines whether to configure the UE 12 to apply the first measurement gap configuration or the second measurement gap configuration based upon whether the UE 12 is synchronized to the non-serving or second cell (cell2) and whether the UE 12 needs system information from the non-serving or second cell (cell2), where the first measurement gap configuration and the second measurement gap configuration are different measurement gap configurations.

Transmitting information to the UE 12 (step 206) regarding whether to apply the first or the second gap configurations, thereby enabling the UE 12 to perform at least D2D operation during at least part of the first or the second gap configurations. In other words, the network node transmits information to the UE 12 that configures the UE 12 to apply the first measurement gap configuration or the second measurement gap configuration as determined by the network node in step 204.

Adapting scheduling of signals to the UE 12 (step 208) during at least part of the configured gaps. For example, the network node may not schedule the UE 12 on any of the serving cells of the UE 12.

Figure 5:
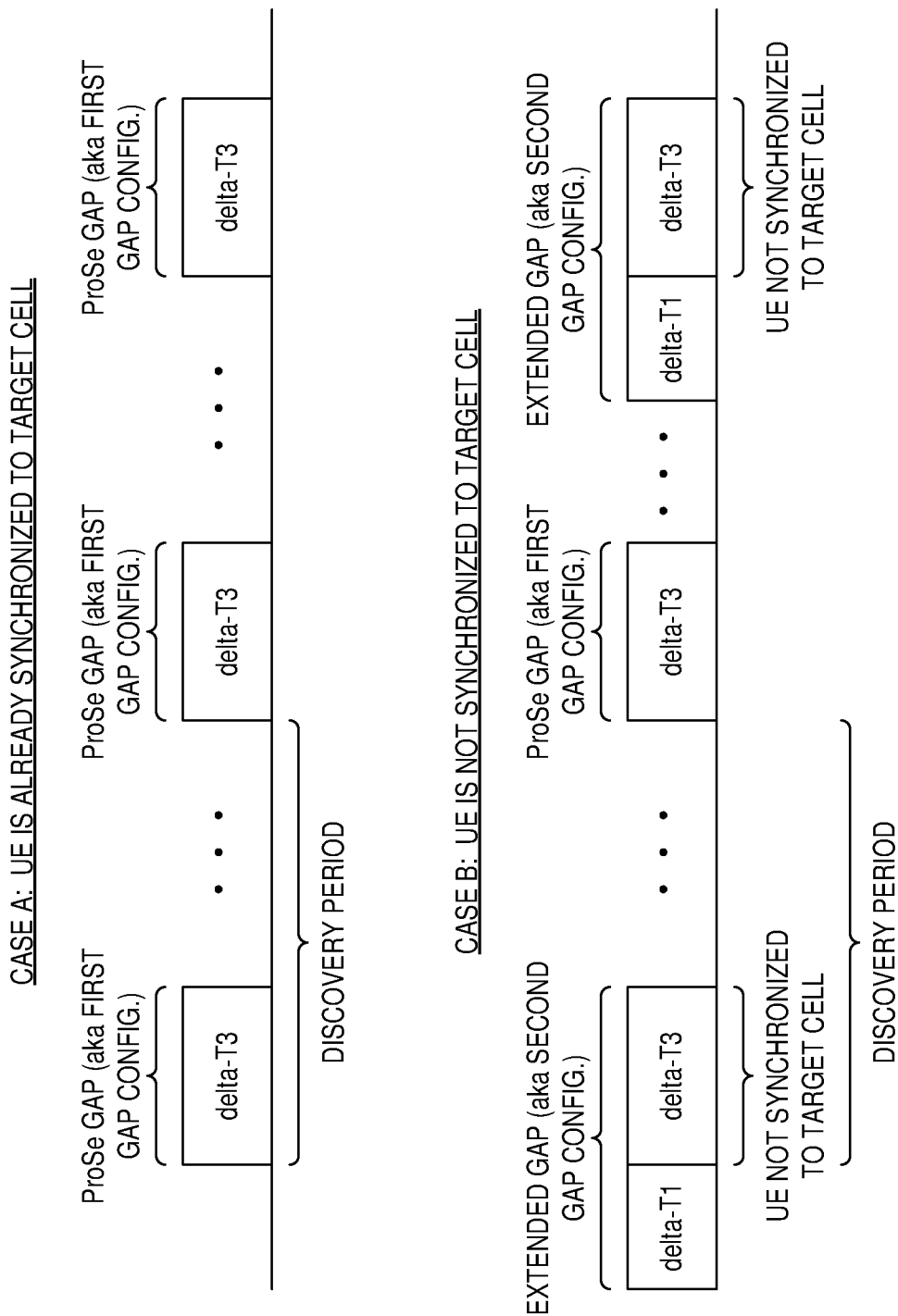
FIG. 5 is a diagram illustrating the timing of certain operations according to an example embodiment.

In some embodiments, a method in a network node (e.g., a radio access node 14) is provided for determining, adapting, and communicating gap configuration for ProSe operation on non-serving carrier. While FIGS. 3A and 3B illustrate example embodiments, the method in the network node can also be described as follows. The network node determines a synchronization state of a UE 12 for operation on a non-serving cell (cell2) on a non-serving carrier (F2). Depending on the determination, the network node may take one of the following actions:

The UE 12 is already synchronized to the target non-serving cell: (see, e.g., FIG. 5, case A)

The network node does not take any specific action on top of gap requested for ProSe operation during a ProSe gap (delta-T3).

The UE 12 is not synchronized to the target non-serving cell: (see, e.g., FIG. 5, case B)

The network node configures the ProSe UE 12 with an extended gap. The ProSe gap (delta-T3) may be extended by delta-T1 resulting in a total gap duration of delta-TX. Note that, as used herein, an extended gap or extended measurement gap is a measurement gap that has a duration or length that is equal to the sum of a measurement gap extension (referred to herein as delta-T1) plus a measurement gap duration for D2D operation (referred to herein as delta-T3). As described herein, the measurement gap extension is a duration for synchronizing to the non-serving cell and, optionally, obtaining system information and/or paging prior to performing a D2D operation(s) in the remainder of the extended measurement gap.

The network node adapts its scheduling according to the adapted gap configuration.

The network node may also communicate the adapted gap configuration to the UE 12, and other nodes in the network.

The method may be further characterized as follows. In other words, the steps of FIGS. 3A and 3B and, likewise, the steps described above performed in the network node may be described in more detail as follows. These details illustrate example embodiments of the corresponding steps.

1.1 Determination of Synchronization State

In certain embodiments, the network node (e.g., the radio access node or eNB 14) makes a determination, e.g., in step 100 of FIG. 3A or step 200 of FIG. 3B, on the synchronization state of the target cell (i.e., the non-serving cell (cell2)) and possibly whether the UE 12 needs to acquire system information messages in the target cell. Based on the determination, the network node derives and/or adapts existing gap configuration, e.g., in step 102 of FIG. 3A or step 204 of FIG. 3B. The network node then configures the ProSe UE 12 with configuration related to gaps, e.g., in step 104 of FIG. 3A or step 206 in FIG. 3B, and it may also communicate the derived configuration to other nodes in the network. The determination of UE synchronization state is done based on one or several criteria which are explained more below.

As a first step, the network node determines the synchronization state of the UE 12 towards the target cell (e.g., cell2) on the non-serving carrier. This target cell is also referred to herein as the non-serving cell (cell2). Cell2, also known as the target cell or non-serving cell, in this case is the cell on which the UE 12 intends to do or is expected to or is required to do ProSe operation. Synchronization state indicates whether the UE 12 knows the timing of cell2, and whether it is able to receive/transmit radio signals from/to cell2. The network node may use one or several criteria to determine the synchronization state of the UE 12 and this is explained more in detail below.

- Timing accuracy of the UE the on the target cell. For example, the network node may assume that the UE 12 is not synchronized to cell2 if the network node has not received any measurement result of the measurement performed by the UE 12 on cell2 from the UE 12 in the last at least X1 seconds, e.g., X1=5 seconds.
- UE 12 speed and location in relation to target cell location. For example, the network node may assume that the UE 12 loses synchronization to cell2 after every Y1 seconds (e.g., Y1=2 seconds) if the UE speed is above a threshold (e.g., 50 kilometers/hour (km/hr)) and if the UE 12 has not done any measurement during this time on cell2.
- Historical data on UE activity, e.g. whether the UE 12 has sent any measurement report on the target cell earlier:
  The UE 12 has sent a valid measurement report (e.g., RSRP) for that cell to the network node in the last T1 seconds (e.g., T1 can be 5 seconds, 5× length of DRX cycle, etc.). The ProSe UE 12 can be configured to report one or more measurements (e.g., RSRP) to the network node on periodic-, event-triggered-, or event-triggered and periodic basis. The measurement report is considered 'a valid measurement report' if one or more requirements are met, e.g. measurement period=800 ms, measurement accuracy is within ±2 decibels (dB).
- Whether the UE 12 is operating in an idle state or in connected state.
- RRC state. For example, in idle state, the UE 12 may be assumed to lose synchronization with respect to cell2 earlier than in connected state. The network node is aware of the UE's 12 RRC state. This is because, in idle state, the UE 12 may use less accurate clocks to save power and processing resources.
- Whether the UE 12 is in Discontinuous Reception (DRX) or not. For example, the UE 12 configured in DRX may be assumed to lose synchronization with respect to cell2 earlier than in non-DRX state. The network node is aware of whether or not the UE 12 is in DRX.
- Time elapsed since last gap configuration. The network node may assume that the UE 12 needs to be synchronized to cell2 if the last gaps were configured for D2D operation on cell2 more than Z1 seconds, e.g. Z1=3 seconds.
- Time elapsed since last extended gap configuration. The network node may assume that the UE 12 needs to be synchronized to cell2 if the last extended gaps were configured for D2D operation on cell2 more than Z2 seconds, e.g. Z2=5 seconds.
- Information received from other nodes in the network.
- Implicit or explicit indication of synchronization status of the UE 12 with respect to cell2 received from the UE 12.

Besides the synchronization states, the UE 12 may also need to periodically read system information messages or paging broadcasted by the non-serving carrier to acquire target cell-related information, and learn transmitting/receiving parameters that are needed to operate in the target cell. The network node determines when the UE 12 has to read system information messages depending on system information periodicity/paging cycle of the target cell or whether any system information change has occurred in the target cell, which would force the UE 12 in acquiring one or more SIBs in the target cell.

If the non-serving carrier belongs to a target eNB 14 different from the serving eNB 14 to which the UE 12 is currently connected or is currently camping, the serving eNB 14 can learn the system information periodicity and/or the paging cycle as well as any change to system information by exchanging information with the target eNB 14. Alternatively, the UE 12 explicitly indicates to the network node the need to have different (i.e., longer) gap configuration to acquire system information.

Typically, the UE 12 may also monitor numerous cells and perform measurements on them provided that the cells are detectable. The cells monitored by the UE 12 may be intra-frequency cells, inter-frequency cells, or inter-RAT cells.

Based on the determination on synchronization state of the UE 12 towards the target cell and possibly whether the UE 12 needs to acquire system information of the target cell, the network may take actions as described below.

1.2 Network Node Actions when Synchronization State Indicates that the UE is not Synchronized to the Non-Serving or Target Cell (Cell2)

If it was determined by the network node that the UE 12 is not synchronized to the target cell (cell2), then the network node may configure the UE 12 with an extended gap of at least delta-TX before the start of the ProSe operation duration. This configuration may be interchangeably referred to herein as the second gap configuration. In the second gap configuration, the total or overall gap length of a gap (i.e., the extended gap having duration delta-TX) comprises of the duration of the gap extension (i.e., delta-TX1) and the duration of the gap in the first gap configuration (i.e., the ProSe gap having duration delta-T3). For example, see FIG. 5, Case B.

The ProSe operation duration in this case may include ProSe discovery transmission durations, i.e. the subframes that are expected to be used for ProSe. The ProSe operation duration is denoted as delta-T3 in this case and the network node may configure the UE 12 with gaps to do ProSe. The ProSe operation duration delta-T3 is also referred to herein as the ProSe gap duration.

As an example, the gap extension (delta-T1) may be defined as 80 ms under the condition that the target cell timing is not known at the UE 12. If this is the case, then the extended gap (delta-TX) is delta-TX=delta-T3+80 ms. In another example, the gap extension (delta-T1) may be defined as 20 ms under the condition that the target cell timing is known at the UE 12; however, the UE 12 still needs time to synchronize and do fine tuning. The advantage of extending the gap is that the UE 12 can perform measurement during the gap extension (delta-T1) to synchronize its receiver and transmitter to be able to trigger ProSe operation during the ProSe gap (delta-T3).

The gap extension (delta-T1) may be predefined or variable. In case of a predefined value, the network node may also send an indicator to the UE 12 along with the gap configuration that indicates whether the UE 12 should apply the first gap configuration (i.e., normal gap without any extension) or the second gap configuration (i.e., normal gap with a gap extension for synchronization). In case of a variable value, the network node may provide the exact length of the gap extension and/or the duration of the second gap (i.e., the total or extended measurement gap delta-TX) and/or duration of the extension of the first gap to the UE 12.

In another exemplary implementation the network node may periodically or occasionally configure the UE 12 with an extended gap, e.g. once every 3 seconds. In other words, the network node may periodically or occasionally configure the UE 12 with the second gap configuration, e.g., once every 3 seconds, where otherwise the UE 12 is configured with the first gap configuration. This implementation is particularly useful in case the network node cannot determine with full certainty the synchronization state of the UE 12 with respect to cell2.

During the extended gap duration including the gap extension delta-T1, the network node may adapt its scheduling, e.g. the network node does not schedule the UE 12 on any of the serving cells during duration of delta-T1. The duration delta-T1 can be predefined or configured by the network node. This is because the UE 12 may cause interruption on serving cells as the UE 12 has to tune to the uplink on the frequency of non-serving carrier for ProSe operation. During this time, the UE 12 may synchronize its receiver and transmitter in time and frequency on that non-serving carrier to be able to transmit and/or receive on that carrier.

The same mechanism may apply in case the network node determines that the UE 12 needs to acquire system information messages in the target cell, i.e. an extended gap configuration is considered to account for reading system information by the UE 12. The extended gap configuration can be different depending on the number of system information messages the UE 12 should read in the target serving-carrier, or when the UE 12 needs to acquire paging.

The advantage of this is that unpredictable interruptions are avoided and the network node may adapt its scheduling such that it avoids scheduling that UE 12 in the subframes of delta-T1 since it knows that it will perform the retuning there. This means that resources are better utilized and it will improve the WAN performance, but also ProSe operation.

If the network node did find out using the synchronization state that cell2 has been known at the UE 12 earlier or if the UE 12 has reported any measurement report on cell2, then the network node may configure the extended gap to be a shorter than if it was completely new. This is because if this cell has been known at the UE 12, then the PCI of that cell may be known even if the current timing is lost at the UE 12. This means that some of the synchronization parameters related to time and frequency may be known. Therefore, a bit shorter extended gap may be sufficient in this case. In other words, if the target cell was previously known to the UE 12, then extended gap (delta-TX) or the gap extension (delta-T1) may be configured such that the extended gap or the gap extension is shorter than if the target cell as not previously known to the UE 12. This method allows the UE 12 to configure an extended gap dynamically based on determination of synchronization state of that UE 12.

As previously mentioned, the network node may configure a gap using a bitmap which includes not only the subframe(s) in which the actual transmission/reception in the non-serving carrier shall occur but also the overheads in terms of subframes in which the UE 12 is expected to acquire synchronization, system information messages, and/or paging from the non-serving carrier. The gap configuration can also be implicit, i.e. the network only signals the subframes in which the UE 12 is not allowed to perform gaps. Alternatively, the possible overheads in terms subframes are specified and the network signals to the UE 12 an index that refers to the intended overhead.

1.3 Network Node Actions when Synchronization State Indicates that the UE is Already Synchronized to the Non-Serving or Target Cell (Cell2)

If it was determined by the network node that the UE 12 is already synchronized to cell2, then no explicit actions are required by the network node. The same mechanism applies when the UE 12 does not need to read system information messages in the target non-serving carrier.

In such cases, the UE 12 applies a first gap configuration with no additional subframes of overhead.

1.4 Method of Signaling Information about Gap Configuration to ProSe UE (and Other Nodes)

This embodiment is related to transmitting derived configuration related to gaps to other nodes. Examples of other nodes which receive the configuration are a ProSe UE, a ProSe Relay UE, an eNB, a base station, an AP, core network nodes, a positioning node, or any other node used for dedicated services such as a SON node.

There are significant advantages in sharing the gap configuration with other nodes. One advantage is that the same or partial information may be applicable to other nodes in the network, and in that case it can be reused. This way, the gaps can be coordinated among the nodes in the network and the improvements (e.g., avoiding colliding gap configurations, measurement performance on non-serving carriers) can be improved in large scale.

A second advantage is that deriving the gap configurations, which can be quite complex sometimes, can be done in one place and only once, and then signaled to other nodes in the network. This way, processing in the different nodes in the network can be reduced.

2 Method in a UE

FIG. 4 illustrates a method in a ProSe capable UE 12 served by a network node (e.g., a radio access node or eNB 14). The method comprises the following.

- Obtaining information for determining synchronization (step 300) of the UE 12 with respect to a second cell (cell2) on a non-serving carrier. This may include downlink measurements, pathloss data, speed, etc. The second cell (cell2) is also referred to as the non-serving cell (cell2).
- Determining the synchronization status (step 302) of the UE 12 with respect to the non-serving cell (cell2) based on the obtained information.
- Based on the determined synchronization status, transmitting a request to the network node (step 304) for configuring the UE 12 with one of: a first gap configuration and a second gap configuration, for D2D operation, wherein the first gap configuration is used when the UE 12 is synchronized to the non-serving cell (cell2), and the second gap configuration is used when the UE 12 is not synchronized to the non-serving cell (cell2). For instance, the first gap configuration may only comprise the subframe(s) in which the UE 12 actually transmits/receives in the non-serving carrier and the subframes needed to tune/retune the TX/RX chain towards the non-serving carrier. The second gap configuration instead may add to the first gap configuration some subframes of overhead that are needed to acquire synchronization (or to read SI/paging, estimation RSRP) from the non-serving carrier.
- Receiving information from the network node (step 306) whether to apply the first or the second gap configurations.
- Adapting or configuring gap configuration (step 308) based on the received information from the network node. For example, the UE 12 adapts its current gap configuration to be the gap configuration indicated by the information received from the network node in step 306 or otherwise configures itself to apply the gap configuration indicated by the information received from the network node in step 306. However, in some embodiments, the UE 12 may further adapt the gap configuration indicated by the information received from the network node in step 306 and configure itself to apply the adapted gap configuration. For example, after the network node configures the UE 12 with the second gap configuration (which has a gap duration equal to the sum of the normal ProSe gap duration and a gap extension), the UE 12 adapts this gap configuration by shortening the gap extension if the UE 12 knows that the non-serving cell was previously known to the UE 12. If the UE 12 adapts the gap configuration, the UE 12, in some embodiments, notifies the network node of the adapted gap configuration.
- Performing at least D2D operation (step 310) during at least part of the adapted or configured gaps. More specifically, if the UE 12 is configured to apply the first gap configuration, the UE 12 is already synchronized to the non-serving cell (cell2) and, as such, the UE 12 performs a D2D operation(s) during the configured gap(s). However, if the UE 12 is configured to apply the second gap configuration, the UE 12 is not already synchronized to the non-serving cell (cell2) and, as such, the UE 12 synchronizes to the non-serving cell (cell2) and then performs D2D operation(s) in the configured gap(s).

Embodiments of a method in a UE 12 for determining a synchronization state of the UE 12 with respect to a non-serving cell on a non-serving frequency and adapting a gap configuration of the UE 12 for ProSe operation on the non-serving carrier are disclosed. While embodiments of the method in the UE 12 are illustrated and described with respect to FIG. 4, the overall procedure in the UE 12 can be as follows.

- The ProSe UE 12 obtains information related to synchronization on the non-serving cell on the non-serving carrier.
- The ProSe UE determines whether it is synchronized to the target non-serving cell (cell2) on non-serving carrier (F2).
- Depending on the determination, the ProSe UE 12 may take one of the following actions:
  - The UE 12 is not synchronized to the target cell: The UE 12 adapts its gap configuration by extending the gap (delta-T3) requested for ProSe operation to allow some time for the UE 12 to perform synchronization. The gap may be extended by duration delta-T1 resulting in a total gap length of delta-TX. If gaps are requested using some bitmap pattern, then the UE 12 may adapt its bitmap pattern by extending it to allow some time prior to the ProSe subframes for synchronization.
  - The UE 12 is synchronized to the target cell: No explicit actions are required by the ProSe UE 12.
- The ProSe UE 12 signals the adapted gap request to the network node.
- The ProSe UE 12 receives information about the gap configuration from the network node.
- The ProSe UE 12 configures the gaps based on the received information about the gaps.
- The ProSe UE 12 synchronizes to cell2 and/or performs D2D operation during the configured gaps.

The UE 12 determines whether it needs an extended gap also on the basis of whether it needs to acquire system information messages or not. When to read system information messages can be up to UE implementation, or it can follow standardized rules, e.g. upon a system information change notification, upon detecting the non-serving carrier, etc.

Additionally, the UE 12 may need to periodically estimate RSRP for a certain number of subframes from the non-serving carrier before performing operations in the non-serving carrier, e.g. in ProSe the UE 12 might need to estimate the RSRP of different resource pools in the non-serving carrier before selecting the transmitting/receiving resources to perform ProSe operations.

In the following section, certain aspects of the described embodiments are described in further detail.

2.1 Determination of Synchronization State

This embodiment discloses a method in a ProSe UE 12 for obtaining, determining and configuring information related to measurement gaps. The determined gap configuration is then used by the ProSe UE 12 to perform measurements on the target cell, which is also known as cell2, on the non-serving carrier frequency, which is also known as F2.

In a first step (e.g., in step 300 of FIG. 4), the ProSe UE 12 obtains synchronization state related information on cell2 on the non-serving carrier frequency on which the UE 12 intends to do or is expected to or is required to do ProSe operation. Synchronization state indicates whether the UE 12 knows the timing of cell2, and whether it is able to receive/transmit radio signals from/to cell2. The UE 12 may use several criteria to determine the synchronization state of the UE 12, e.g., in step 302 of FIG. 4, and examples of these criteria are:

- Timing accuracy of the UE 12 on target cell, e.g. determining whether the UE 12 maintains the timing of cell2. For example, this can be based on whether the UE 12 has done any measurement on cell2 in the last X2 seconds or not.
- UE speed and location in relation to target cell location. For example, the UE 12 may assume that the UE 12 loses synchronization to cell2 after every Y2 seconds (e.g., Y2=2 seconds) if the UE 12 speed is above a threshold (e.g., 50 km/hr) and if the UE 12 has not done any measurement during this time on cell2.
- Historical data on UE activity, e.g. whether UE 12 has sent any measurement report on the target cell earlier:
  - The UE 12 has sent a valid measurement report (e.g., RSRP) for that cell to the network node in the last T1 seconds (e.g., T1 can be 5 seconds, 5× length of DRX cycle, etc.). The ProSe UE 12 can be configured to report one or more measurements (e.g., RSRP) to the network node on periodic-, event-triggered-, or event-triggered and periodic basis. The measurement report is considered 'a valid measurement report' if one or more requirements are met, e.g. measurement period=800 ms, measurement accuracy is within ±2 dB.
- Whether the UE 12 is operating in an idle state or in connected state.
- RRC state. For example, in idle state, the UE 12 may be assumed to lose synchronization with respect to cell2 earlier than in connected state. This is because, in idle state, the UE 12 may use less accurate clocks to save power and processing resources.
- Whether the UE 12 is in DRX or not. For example, the UE 12 configured in DRX may be assumed to lose synchronization with respect to cell2 earlier than in non-DRX state.
- Time elapsed since last gap configuration. The UE 12 may assume that the UE 12 needs to be synchronized to cell2 if the last gaps were configured for D2D operation on cell2 more than Z1' seconds, e.g. Z1'=3 seconds.
- Time elapsed since last extended gap configuration. The UE 12 may assume that the UE 12 needs to be synchronized to cell2 if the last extended gaps were configured for D2D operation on cell2 more than Z2' seconds, e.g. Z2'=5 seconds.
- Information received from other nodes in the network.

Typically, the UE 12 may also monitor numerous cells and perform measurements on them provided that the cells are detectable. The cells monitored by the UE 12 may be intra-frequency cells, inter-frequency cells, or inter-RAT cells.

After determining the synchronization state of the UE 12 with respect to cell2, and possibly after determining whether reading of system information is needed or not, the UE 12 may transmit information which implicitly or explicitly indicates the type of gaps needed by the UE 12 to the network node, e.g., in step 304 of FIG. 4.

Based on the received information related to the synchronization state of the UE 12 with respect to the target cell (i.e., cell2), the network may configure the UE 12 with appropriate type of gaps, e.g., in step 306 of FIG. 4, as described below.

2.2 UE Actions when Synchronization State Indicates that the UE is not Synchronized to the Non-Serving or Target Cell (Cell2)

If it was determined by the UE 12 that the UE 12 is not synchronized to the target cell (cell2), then the UE 12 may signal the network node one or more of the following sets of information, e.g., in step 304 of FIG. 4:

- indication that the UE 12 is not synchronized to cell2 for D2D operation on cell2;
- indication that the UE 12 needs an extended gap to synchronize to cell2 before D2D operation on cell2;
- duration or length of an extended gap required by the UE 12 for synchronizing to cell2 to start D2D operation on cell2.

In response to receiving the above request at the network node, the network node may configure the UE 12 with a second gap configuration, e.g., by transmitting the information received by the UE 12 in step 306 of FIG. 4. Thus, the information received by the UE 12 in step 306 of FIG. 4 includes an indication of the gap configuration to be applied by the UE 12. The UE 12, upon receiving the second gap configuration, may adapt its gap configuration such that an extended gap of at least delta-TX before the start of ProSe operation is applied by the UE. This configuration may interchangeably be called herein the second gap configuration. The ProSe operation duration in this case may include ProSe discovery transmission durations, i.e. the subframes that are expected to be used for ProSe. The ProSe operation duration is denoted as delta-T3 in this case and the network node may signal the gap or the UE 12 may request the gaps to do ProSe.

As an example, the gap extension (delta-T1) may be defined as 80 ms under the condition that the target cell timing is not known at the UE 12. If this is the case, then the extended measurement gap (delta-TX) configured by the second gap configuration is delta-TX=delta-T3+80. In another example, the gap extension (delta-T1) may be defined as 20 ms under the condition that the target cell timing is known at the UE 12; however, the UE 12 still needs time to synchronize and do fine tuning. The advantage of extending the gap is that the UE 12 can perform measurement during the gap extension (delta-T1) to synchronize its receiver and transmitter to be able to trigger ProSe operation during delta-T3.

During the second gap duration including delta-T1, the UE 12 may not expect to be scheduled by its serving network node on any the serving/activated cell during the duration of delta-T1 of the gap extension. This is because the UE 12 may cause interruption on serving cells as the UE 12 has to tune to the uplink on the frequency of the non-serving carrier for ProSe operation. During this time, the UE 12 may synchronize its receiver and transmitter in time and frequency on that non-serving carrier to be able to transmit and/or receive on that carrier. For example, during the duration of the gap extension of the second gap (i.e., the gap configured by the second gap configuration), the UE 12 first acquires the downlink timing of cell2 (e.g., by receiving reference signals such as PSS/SSS, Discovery Reference Signal (DRS), or Common Reference Signal (CRS), etc.) and uses this to derive its uplink transmit timing on cell2 for transmitting D2D signals on sidelink resources on cell2. After the gap extension duration, the UE 12 performs D2D operation during the rest of the gap.

A potential benefit of the above approach is that unpredictable interruptions may be avoided, and the network node, once it becomes aware of the extended gap, may adapt its scheduling such that it avoids scheduling that UE 12 in the subframes of delta-T1 since it knows that the UE 12 will perform retuning there. This means that resources are better utilized and it will improve both the WAN performance and ProSe operation.

If the UE 12 finds out using the synchronization state that cell2 has been known at the UE 12 earlier or if UE 12 has reported any measurement report on cell2, then the UE 12 may adapt its extended gap configuration to be shorter than if cell2 was completely new. This is because if this cell has been known at the UE 12, then PCI of that cell may be known even if the current timing is lost at the UE 12. This means that some of the synchronization parameters related to time and frequency may be known. Therefore, a bit shorter extended gap may be sufficient in this case. This method allows the UE 12 to configure an extended gap dynamically based on determination of synchronization state of that UE 12. For example, in some embodiments, the UE 12 may shorten its measurement gap (e.g., shorten its gap extension) and notify the network node.

The desired gap configuration maybe reported to the network in the form of a bitmap, as previously mentioned. Such a bitmap may include the actual subframe(s) in which the UE 12 intends to perform non-serving carrier operations as well as the subframes that are needed for the UE 12 to tune/retune the TX/RX chain towards the target carrier, and the necessary subframes to acquire synchronization and possibly SI messages.

Alternatively, the UE 12 reports the actual overhead in terms of subframes, that is needed to acquire synchronization, SI messages, paging, or to estimate RSRP in the non-serving carrier. The possible overheads in terms of subframes might be specified and the UE 12 reports an index that refers to the intended/requested overhead.

2.3 UE Actions when Synchronization State Indicates that the UE is Already Synchronized to the Non-Serving or Target Cell (Cell2)

If it was determined by the UE 12 that the UE 12 is already synchronized to cell2 or that no system information, paging, or other subframes to evaluate (e.g., RSRP estimation) the non-serving carrier are needed, then the UE 12 may request the network node to configure only the first gap configuration, i.e. gaps without an extended gap for synchronization. This request is provided in, e.g., step 304 of FIG. 4. For example, the request or indication sent by the UE 12 may comprise the following:

indication that the UE 12 is synchronized to cell2 for D2D operation on cell2; or indication that the UE 12 needs the first gap configuration for D2D operation on cell2.

In response to receiving the above request at the network node, the network node may configure the UE 12 with the first gap configuration, e.g., by providing the corresponding information received by the UE 12 in step 306 of FIG. 4.

The UE 12 creates the gaps according to the first gap configuration and uses them for D2D operation on cell2, e.g., in steps 308 and 310, respectively, of FIG. 4.

2.4 Method of Signaling Information about Gap Configuration to Network Nodes (and Other Nodes)

This embodiment is related to transmitting derived configuration related to gaps to other nodes. Examples of other nodes which receive the configuration are other ProSe UEs, ProSe Relay UEs, eNBs, base stations, AP core network nodes, positioning nodes, or any other nodes used for dedicated services such as SON nodes.

There are significant advantages in sharing the gap configuration with other nodes. One advantage is that the same or partial information may be applicable to other ProSe UEs and/or nodes in the network, and in that case it can be reused. This way, the gaps can be coordinated among the UEs and nodes in the network and the improvements (e.g., avoiding colliding gap configurations, measurement performance on non-serving carriers) can be improved in large scale.

A second advantage is that deriving the gap configurations, which can be quite complex sometimes, can be done in one place and only once, and then signaled to other UEs and nodes in the network. This way, processing in the different UEs and nodes in the network can be reduced.

3 Overview of Example Embodiments

As indicated by the foregoing, certain embodiments of the disclosed subject matter relate to a network node and/or a ProSe UE.

Certain embodiments in a network node comprise the following.

Network node determining whether a UE 12 is synchronized to the target non-serving cell on a non-serving carrier; the network node may use different criteria to verify this:

Examples of such criteria are: timing accuracy, UE speed, whether the UE 12 has reported on that cell earlier, RRC state, UE activity and/or historical data on that cell, and information received from other nodes.

Depending on the determination, the network node may take one of the following actions:

The UE 12 is not synchronized to the target non-serving cell:

Network node configures the ProSe UE 12 with an extended gap. The ProSe gap (delta-T3) may be extended by delta-T1 resulting in a total gap duration of delta-TX.

The UE 12 is synchronized to the target non-serving cell:

Network node does not take any specific action on the top of the gap requested for ProSe operation during delta-T3.

The network node adapts its scheduling according to the gap configuration.

The above mechanism may also apply to configure gaps in the UE 12 depending on whether the UE 12 needs or does not need additional subframes of overhead to acquire SI, paging, and estimate RSRP from the non-serving carrier. The need for such additional overhead may be explicitly reported by the UE 12 or exchanged between network nodes.

Certain embodiments in a UE 12 comprise the following:

ProSe UE 12 obtaining information related to synchronization on the non-serving cell on the non-serving carrier.

ProSe UE 12 determining whether it is synchronized to the target non-serving cell (cell2) on non-serving carrier (F2).

Depending on the determination, the ProSe UE 12 may take one of the following actions:

The UE 12 is not synchronized to the target cell: the UE 12 adapts it gap configuration such by extending the gap (delta-T3) requested for ProSe operation to allow some time for the UE 12 to perform synchronization. The gap may be extended by duration delta-T1 resulting in a total gap length of delta-TX. If gaps are requested using some bitmap pattern then the UE 12 may adapt its bitmap pattern by extending it to allow some time prior to the ProSe subframes for synchronization.

The UE 12 is synchronized to the target cell: No explicit actions are required by the ProSe UE 12.

Signaling the adapted gap request to the network node.

The above mechanism may also be applied by the UE 12 to report to the network node the desired gap configuration which may be different in case the UE 12 needs or does not need to acquire SI, paging, and estimate RSRP from the non-serving carrier.

4 Example Embodiments of a Wireless Device and a Network Node

Figure 6:
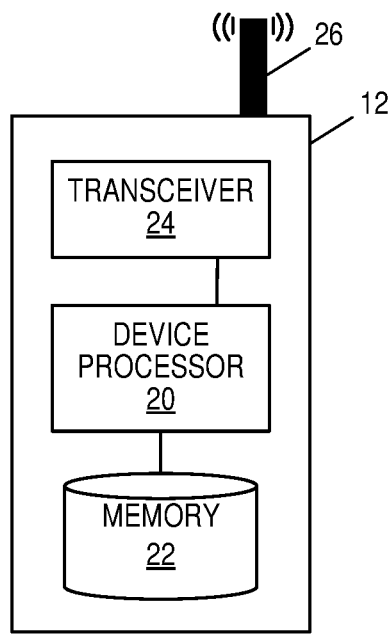
FIGS. 6 and 7 are diagrams illustrating example embodiments of a wireless communication device.
Figure 7:
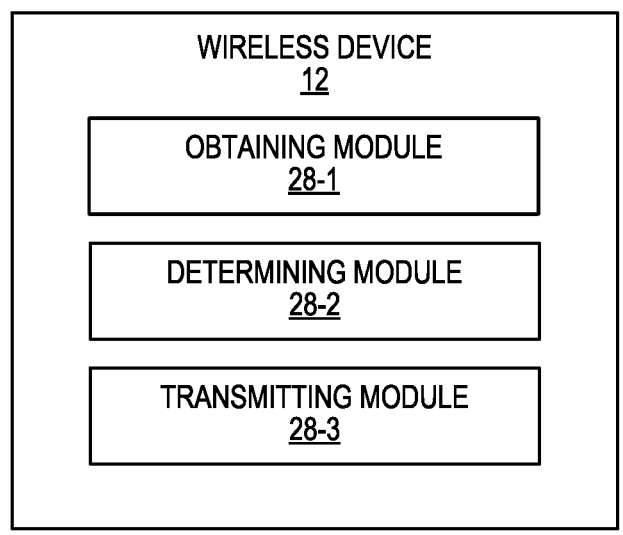

Although wireless communication devices 12 may represent communication devices that include any suitable combination of hardware and/or software, these wireless communication devices may, in certain embodiments, represent devices such as an example wireless communication device illustrated in greater detail by FIG. 6 and FIG. 7. Similarly, although the illustrated radio access node 14 may represent network nodes that include any suitable combination of hardware and/or software, these nodes may, in particular embodiments, represent devices such as the example radio access node 14 illustrated in greater detail by FIGS. 8 through 10.

Referring to FIG. 6, a wireless communication device 12 (also referred to herein as simply a wireless device 12 or UE 12) comprises a processor 20 (e.g., a Central Processing Unit(s) (CPU(s)), Application Specific Integrated Circuit(s) (ASIC(s)), Field Programmable Gate Array(s) (FPGA(s)), and/or the like), a memory 22, a transceiver 24, and an antenna 26. In certain embodiments, some or all of the functionality described as being provided by UEs, MTC, or M2M devices, and/or any other types of wireless communication devices may be provided by the device processor 20 executing instructions stored on a computer-readable medium, such as the memory 22 shown in FIG. 6. Alternative embodiments may include additional components beyond those shown in FIG. 6 that may be responsible for providing certain aspects of the device's functionality, including any of the functionality described herein.

FIG. 7 illustrates the wireless communication device 12 according to some other embodiments of the present disclosure. As illustrated, the wireless communication device 12 includes one or more modules 28, each of which is implemented in software. The module(s) 28 operate to provide the functionality of the wireless communication device 12 as described herein. In other words, in certain embodiments, some or all of the functionality described as being provided by UEs, MTC, or M2M devices, and/or any other types of wireless communication devices may be provided by the module(s) 28. As an example, in some embodiments, the module(s) 28 include an obtaining module 28-1, a determining module 28-2, and a transmitting module 28-3. The obtaining module 28-1 is operable to obtain first information for determining whether the wireless communication device 12 that is configured with a serving cell 16 that operates on a first frequency is synchronized to a non-serving cell 16 that operates on a second frequency, the second frequency being a non-serving frequency that the wireless communication device 12 intends to use for D2D communication. The determining module 28-2 is operable to determine whether the wireless communication device 12 is synchronized to a non-serving cell 16 that operates on a second frequency based on the first information. The transmitting module 28-3 is operable to, upon determining that the wireless communication device 12 is not synchronized to the non-serving cell 16 that operates on the second frequency, transmit a request to a network node. The request comprises at least one of: an indication that the wireless communication device 12 is not synchronized to the non-serving cell 16 that operates on the second frequency, an indication that the wireless communication device 12 needs an extended measurement gap in order to synchronize to the non-serving cell 16 before performing a D2D operation, and a duration of an extended gap requested by the wireless communication device 12 for synchronizing to the non-serving cell 16 in order to perform a D2D operation.

Figure 8:
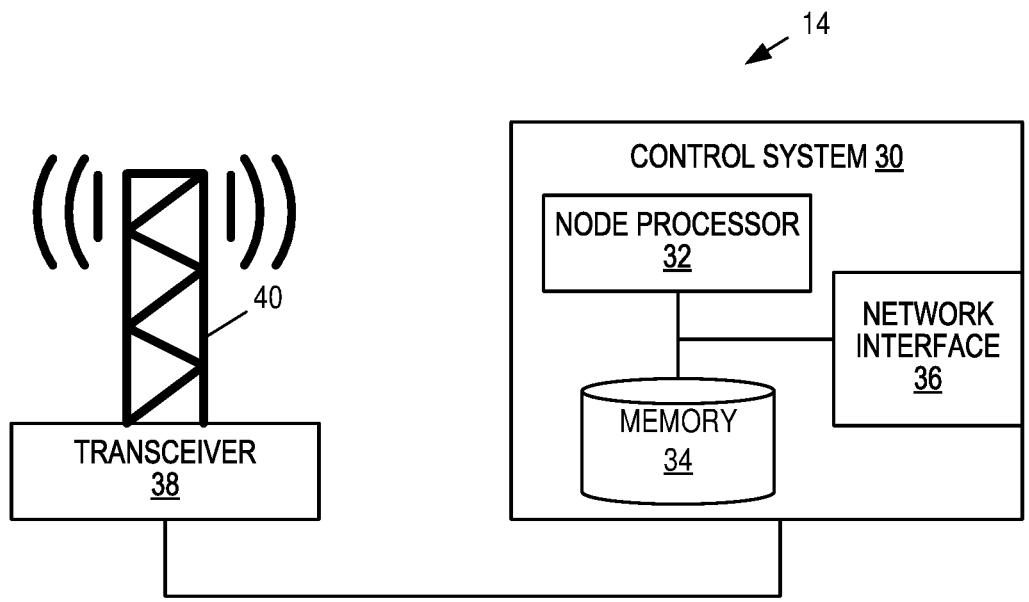
FIGS. 8 through 10 are diagrams illustrating example embodiments of a radio access node.

Referring to FIG. 8, a radio access node 14 comprises a control system 30 that includes a node processor 32, a memory 34, and a network interface 36. In addition, the radio access node 14 includes a transceiver 38 and an antenna 40. In certain embodiments, some or all of the functionality described as being provided by a base station, a node B, an eNB, and/or any other type of network node may be provided by the node processor 32 executing instructions stored on a computer-readable medium, such as the memory 34 shown in FIG. 8. Alternative embodiments of the radio access node 14 may comprise additional components to provide additional functionality, such as the functionality described herein and/or related supporting functionality.

Figure 9:
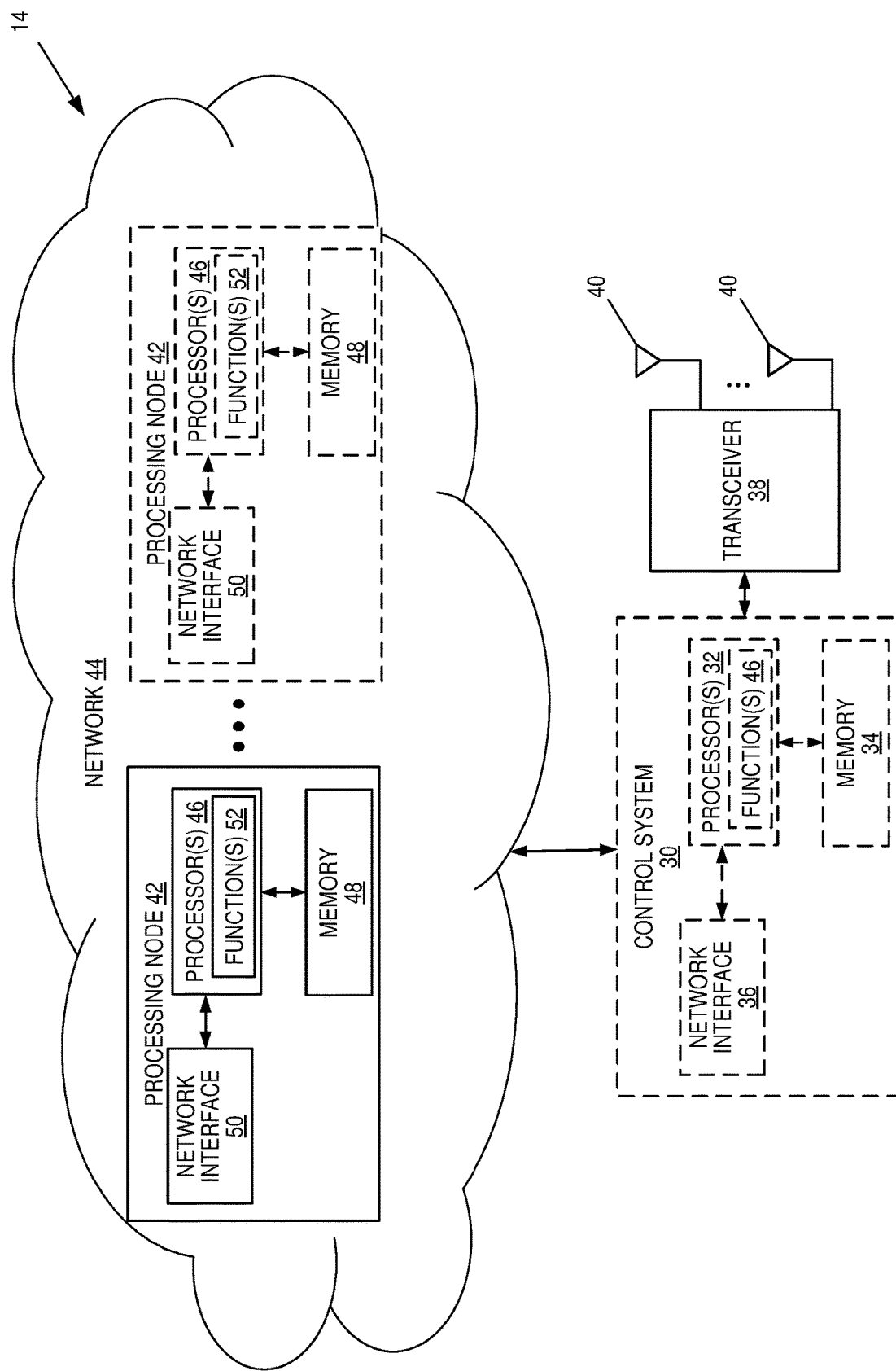

FIG. 9 is a schematic block diagram that illustrates a virtualized embodiment of the radio access node 14 according to some embodiments of the present disclosure. Other types of network nodes may have similar architectures (particularly with respect to including processor(s), memory, and a network interface).

As used herein, a "virtualized" radio access node 14 is a radio access node 14 in which at least a portion of the functionality of the radio access node 14 is implemented as a virtual component (e.g., via a virtual machine(s) executing on a physical processing node(s) in a network(s)). As illustrated, the radio access node 14 optionally includes the control system 30, as described with respect to FIG. 8. The radio access node 14 also includes the transceiver 38 coupled to the one or more antennas 40, as described above. The control system 30 is connected to the transceiver 38 via, for example, an optical cable or the like. The control system 30 is connected to one or more processing nodes 42 coupled to or included as part of a network(s) 44 via the network interface 36. Alternatively, if the control system 30 is not present, the transceiver 38 is connected to the one or more processing nodes 42 via a network interface(s). Each processing node 42 includes one or more processors 46 (e.g., CPUs, ASICs, FPGAs, and/or the like), memory 48, and a network interface 50.

In this example, functions 52 of the radio access node 14 described herein are implemented at the one or more processing nodes 42 or distributed across the control system 30 and the one or more processing nodes 42 in any desired manner. In some particular embodiments, some or all of the functions 52 of the radio access node 14 described herein are implemented as virtual components executed by one or more virtual machines implemented in a virtual environment(s) hosted by the processing node(s) 42. As will be appreciated by one of ordinary skill in the art, additional signaling or communication between the processing node(s) 42 and the control system 30 or alternatively the transceiver 38 is used in order to carry out at least some of the desired functions. Notably, in some embodiments, the control system 30 may not be included, in which case the transceiver 38 communicates directly with the processing node(s) 42 via an appropriate network interface(s).

In some embodiments, a computer program including instructions which, when executed by at least one processor, causes the at least one processor to carry out the functionality of the radio access node 14 or a processing node 42 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 10:
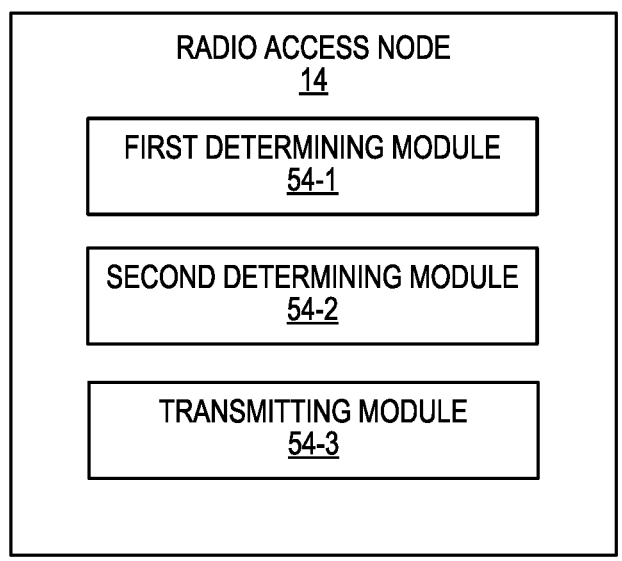

FIG. 10 is a schematic block diagram of the radio access node 14, or more generally a network node, according to some other embodiments of the present disclosure. The radio access node 14 includes one or more modules 54, each of which is implemented in software. The module(s) 54 provide the functionality of the radio access node 14 described herein. In this example, the radio access node 14 includes a first determining module 54-1, a second determining module 54-2, and a transmitting module 54-3. The first determining module 54-1 is operable to determine whether a wireless device 12 that is configured with a serving cell 16 that operates on a first frequency is synchronized to a non-serving cell 16 that operates on a second frequency, where the second frequency is, e.g., a frequency that the wireless device 12 intends or is expected to use for D2D communication. The second determining module 54-2 is operable to determine whether to configure the wireless device 12 to apply a first measurement gap configuration or a second measurement gap configuration based upon whether the wireless device 12 is synchronized to the non-serving cell 16 that operates on the second frequency, the first measurement gap configuration and the second measurement gap configuration being different measurement gap configurations. The transmitting module 54-3 operable to transmit information to the wireless device 12 that configures the wireless device 12 to apply the first measurement gap configuration or the second measurement gap configuration as determined by the network node.

The above and other embodiments described herein may provide various potential benefits compared to conventional techniques and technologies, including but not limited to the following.

Certain embodiments may enable ProSe operation on non-serving carriers. Certain described methods may reduce interruption time on the WAN when it intends to do D2D on a non-serving carrier because the interruptions are allowed in a controlled manner by the network node.

Certain embodiments may enable resources to be used more efficiently when a D2D UE 12 intends to operate on non-serving carrier because it allows the UE 12 to perform D2D only when the UE 12 is synchronized to the non-serving cell.

Certain embodiments may prevent scheduling grants from being lost at the network node when the D2D UE 12 served by the network node tunes to the cell belonging to non-serving carrier.

Certain embodiments may enable a UE 12 to perform ProSe operation on a cell of the non-serving carrier even if the UE 12 is not synchronized to that cell before it receives gaps for doing ProSe. This in turn may avoid a need for a UE 12 to measure on cells of non-serving carrier well before starting the ProSe operation on that carrier and it also avoids any other type of periodical gaps which may degrade the WAN performance.

While the disclosed subject matter has been presented above with reference to various embodiments, it will be understood that various changes in form and details may be made to the described embodiments without departing from the overall scope of the disclosed subject matter.

The following acronyms are used throughout this disclosure.

3GPP Third Generation Partnership Project
AGC Amplitude Gain Control
AP Access Point
ASIC Application Specific Integrated Circuit
BLER Block Error Rate
BSC Base Station Controller
BTS Base Transceiver Station
CA Carrier Aggregation
CDMA Code Division Multiple Access
CGI Cell Global Identity
CPU Central Processing Unit
CQI Channel Quality Indicator
CRS Common Reference Signal
CSI Channel State Information
CSI-RS Channel State Information Reference Signal
D2D Device-to-Device
DAS Distributed Antenna System
dB Decibel
DMRS Demodulation Reference Signal
DRS Discovery Reference Signal
DRX Discontinuous Reception
EDGE Enhanced Data Rates for Global Evolution
eNB Enhanced or Evolved Node B
E-SMLC Evolved Serving Mobile Location Center
FDD Frequency Division Duplexing
FPGA Field Programmable Gate Array
GERAN Global System for Mobile Communications Enhanced Data Rates for Global Evolution Radio Access Network
GSM Global System for Mobile Communications
HSPA High Speed Packet Access
ID Identity
km/hr Kilometers/Hour
LEE Laptop Embedded Equipment
LME Laptop Mounted Equipment
LTE Long Term Evolution
M2M Machine-to-Machine
MCG Master Cell Group
MDT Minimization of Drive Tests
MeNB Master Enhanced or Evolved Node B
MIB Master Information Block
MME Mobility Management Entity
ms Millisecond
MSC Mobile Switching Center
MSR Multi-Standard Radio MTC Machine Type Communication
O&M Operation and Maintenance
ONC Out-of-Network-Coverage
OSS Operations Support System
PCell Primary Cell
PCI Physical Cell Identity
PDA Personal Digital Assistant
PLMN Public Land Mobile Network
PMI Precoding Matrix Indicator
ProSe Proximity Services
PSCell Primary Secondary Cell
PSS Primary Synchronization Signal
PSSS Primary Sidelink Synchronization Signal
RAT Radio Access Technology
RF Radio Frequency
RI Rank Indicator
RIP Received Interference Power
RLM Radio Link Monitoring
RNC Radio Network Controller
RRC Radio Resource Control
RRH Remote Radio Head
RRU Remote Radio Unit
RSRP Reference Signal Received Power
RSRQ Reference Signal Received Quality
RSTD Reference Signal Time Difference
RX Reception
SA Scheduling Assignment
SCell Secondary Cell
SCG Secondary Cell Group
SeNB Secondary Enhanced or Evolved Node B
SI System Information
SIB System Information Block
SINR Signal to Interference plus Noise Ratio
SNR Signal to Noise Ratio
SON Self-Organizing Network
SSS Secondary Synchronization Signal
SSSS Secondary Sidelink Synchronization Signal
TA Timing Advance
TDD Time Division Duplexing
TX Transmission
UE User Equipment
USB Universal Serial Bus
V2I Vehicle to Infrastructure
V2P Vehicle to Pedestrian
V2X Vehicle to X
WAN Wireless Access Network
WCDMA Wideband Code Division Multiple Access
WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network, comprising:
    determining whether a wireless device that is configured with a serving cell that operates on a first frequency is synchronized to a non-serving cell that operates on a second frequency, the second frequency being a non-serving frequency;
    determining whether to configure the wireless device to apply a first measurement gap configuration or a second measurement gap configuration based upon whether the wireless device is synchronized to the non-serving cell that operates on the second frequency, the first measurement gap configuration and the second measurement gap configuration being different measurement gap configurations, wherein the second measurement gap duration comprises the first measurement gap duration plus an extension that is a function of at least one of a group consisting of:
        whether the wireless device needs to acquire system information from the non-serving cell, a number of system information blocks that the wireless device needs to acquire from the non-serving cell,
        whether the wireless device needs to acquire paging from the non-serving cell, and
        whether the non-serving cell has previously been known to the wireless device,
    and wherein determining whether to configure the wireless device to apply the first measurement gap configuration or the second measurement gap configuration comprises:
        determining to configure the wireless device to apply the first measurement gap configuration upon determining that the wireless device is synchronized to the non-serving cell that operates on the second frequency; and
        determining to configure the wireless device to apply the second measurement gap configuration upon determining that the wireless device is not synchronized to the non-serving cell that operates on the second frequency; and
    transmitting information to the wireless device that configures the wireless device to apply the first measurement gap configuration or the second measurement gap configuration as determined by the network node.

2. The method of claim 1 further comprising adapting scheduling of signals to the wireless device based on whether the wireless device is configured with the first measurement gap configuration or the second measurement gap configuration.

3. The method claim 1 further comprising:
    determining whether the wireless device needs to obtain system information from the non-serving cell that operates on the second frequency;
    wherein determining whether to configure the wireless device to apply the first measurement gap configuration or the second measurement gap configuration comprises:
        determining to configure the wireless device to apply the first measurement gap configuration upon determining that the wireless device is synchronized to the non-serving cell that operates on the second frequency and does not need to obtain system information from the non-serving cell that operates on the second frequency; and
        determining to configure the wireless device to apply the second measurement gap configuration upon determining that the wireless device is not synchronized to the non-serving cell that operates on the second frequency and/or needs to obtain system information from the non-serving cell that operates on the second frequency.

4. The method of claim 1 wherein the second measurement gap duration comprises the first measurement gap duration plus an extension, wherein the extension is a variable.

5. The method of claim 1 wherein the second measurement gap duration comprises the first measurement gap duration plus an extension, wherein the extension is a predefined variable.

6. The method of claim 1 further comprising:
  determining whether the wireless device needs to obtain system information from the non-serving cell that operates on the second frequency; and
  wherein determining whether to configure the wireless device to apply the first measurement gap configuration or the second measurement gap configuration comprises determining whether to configure the wireless device to apply the first measurement gap configuration or the second measurement gap configuration based upon whether the wireless device is synchronized to the non-serving cell that operates on the second frequency and whether the wireless device needs to obtain system information from the non-serving cell that operates on the second frequency.

7. The method of claim 1 wherein determining whether to configure the wireless device to apply the first measurement gap configuration or the second measurement gap configuration comprises, if a certainty of whether the wireless device is synchronized to the non-serving cell that operates on the second frequency is less than a threshold, determining to configure the wireless device to periodically apply the second measurement gap configuration and otherwise apply the first measurement gap configuration.

8. The method of claim 1 wherein determining whether the wireless device is synchronized to the non-serving cell that operates on the second frequency comprises determining whether the wireless device is synchronized to the non-serving cell that operates on the second frequency based on at least one of:
  a timing accuracy of the wireless device on the non-serving cell;
  a speed of the wireless device in relation to the non-serving cell;
  a location of the wireless device in relation to the non-serving cell;
  historical data on activity of the wireless device;
  a radio resource control state of the wireless device;
  whether the wireless device is operating in an idle state or in connected state;
  whether the wireless device is operating in a discontinuous reception mode of operation;
  an amount of time that has elapsed since the wireless device was last configured with a measurement gap configuration;
  an amount of time that has elapsed since the wireless device was last configured with the second measurement gap configuration;
  information received from one or more other nodes in the cellular communications network; and
  an implicit or explicit indication of synchronization status of the wireless device with respect to the non-serving cell received from the wireless device.

9. A network node for a cellular communications network, comprising:
  a processor; and
  a memory comprising instructions executable by the processor whereby the network node is operable to:
    determine whether a wireless device that is configured with a serving cell that operates on a first frequency is synchronized to a non-serving cell that operates on a second frequency, the second frequency being a non-serving frequency;
    determine whether to configure the wireless device to apply a first measurement gap configuration or a second measurement gap configuration based upon whether the wireless device is synchronized to the non-serving cell that operates on the second frequency, the first measurement gap configuration and the second measurement gap configuration being different measurement gap configurations, wherein the second measurement gap duration comprises the first measurement gap duration plus an extension that is a function of at least one of a group consisting of:
      whether the wireless device needs to acquire system information from the non-serving cell, a number of system information blocks that the wireless device needs to acquire from the non-serving cell,
      whether the wireless device needs to acquire paging from the non-serving cell, and
      whether the non-serving cell has previously been known to the wireless device, and
    wherein the determining whether to configure the wireless device to apply the first measurement gap configuration or the second measurement gap configuration comprises:
      determining to configure the wireless device to apply the first measurement gap configuration upon determining that the wireless device is synchronized to the non-serving cell that operates on the second frequency; and
      determining to configure the wireless device to apply the second measurement gap configuration upon determining that the wireless device is not synchronized to the non-serving cell that operates on the second frequency; and
    transmit information to the wireless device that configures the wireless device to apply the first measurement gap configuration or the second measurement gap configuration as determined by the network node.

10. A method of operation of a wireless device in a cellular communications network, comprising:
  obtaining first information for determining whether the wireless device that is configured with a serving cell that operates on a first frequency is synchronized to a non-serving cell that operates on a second frequency, the second frequency being a non-serving frequency;
  determining whether the wireless device is synchronized to the non-serving cell that operates on the second frequency based on the first information; and
  upon determining that the wireless device is not synchronized to the non-serving cell that operates on the second frequency, transmitting a request to a network node, the request comprising at least one of:
    an indication that the wireless device needs an extended measurement gap in order to synchronize to the non-serving cell before performing a Device-to-Device, D2D, operation; and
    a duration of an extended measurement gap requested by the wireless device for synchronizing to the non-serving cell in order to perform a D2D operation, wherein the extended measurement gap comprises a base gap duration plus an extension that is a function of at least one of a group consisting of:
      whether the wireless device needs to acquire system information from the non-serving cell, a number of system information blocks that the wireless device needs to acquire from the non-serving cell,
      whether the wireless device needs to acquire paging from the non-serving cell, and
      whether the non-serving cell has previously been known to the wireless device.

11. The method of claim 10 further comprising:
receiving, in response to the request, second information from the network node, the second information comprising a measurement gap configuration for the wireless device, the measurement gap configuration comprising a configuration for an extended measurement gap where the extended measurement gap is a measurement gap having a duration that comprises a measurement gap extension in which the wireless device to synchronize to the non-serving cell plus a measurement gap duration in which the wireless device can perform a D2D operation;
configuring a measurement gap configuration applied by the wireless device in accordance with the second information; and
during a measurement gap having the configured measurement gap duration, synchronizing to the non-serving cell that operates on the second frequency and performing a D2D operation on the non-serving cell that operates on the second frequency.

12. The method of claim 10 further comprising, adapting a measurement gap configuration of the wireless device.

13. The method of claim 10 wherein determining whether the wireless device is synchronized to the non-serving cell that operates on the second frequency comprises determining whether the wireless device is synchronized to the non-serving cell that operates on the second frequency based on at least one of:
a timing accuracy of the wireless device on the non-serving cell;
a speed of the wireless device in relation to the non-serving cell;
a location of the wireless device in relation to the non-serving cell;
historical data on activity of the wireless device;
a radio resource control state of the wireless device;
whether the wireless device is operating in an idle state or in connected state;
whether the wireless device is operating in a discontinuous reception mode of operation;
an amount of time that has elapsed since the wireless device was last configured with a measurement gap configuration;
an amount of time that has elapsed since the wireless device was last configured with an extended measurement gap; and
information received from one or more other nodes in the cellular communications network.

14. A wireless device for a cellular communications network, the wireless device comprising:
a transceiver;
a processor; and
a memory comprising instructions executable by the processor whereby the wireless device is operable to:
obtain first information for determining whether the wireless device that is configured with a serving cell that operates on a first frequency is synchronized to a non-serving cell that operates on a second frequency, the second frequency being a non-serving frequency;
determine whether the wireless device is synchronized to the non-serving cell that operates on the second frequency based on the first information; and
upon determining that the wireless device is not synchronized to the non-serving cell that operates on the second frequency, transmit a request to a network node, the request comprising at least one of:
an indication that the wireless device needs an extended measurement gap in order to synchronize to the non-serving cell before performing a Device-to-Device, D2D, operation; and
a duration of an extended measurement gap requested by the wireless device for synchronizing to the non-serving cell in order to perform a D2D operation, wherein the extended measurement gap comprises a base gap duration plus an extension that is a function of at least one of a group consisting of:
whether the wireless device needs to acquire system information from the non-serving cell, a number of system information blocks that the wireless device needs to acquire from the non-serving cell,
whether the wireless device needs to acquire paging from the non-serving cell, and
whether the non-serving cell has previously been known to the wireless device.

15. The wireless device of claim 14 wherein the memory further comprises instructions executable by the processor whereby the wireless device is operable to adapt a measurement gap configuration of the wireless device.

16. The wireless device of claim 14, wherein the first information comprises at least one of:
a timing accuracy of the wireless device on the non-serving cell;
a speed of the wireless device in relation to the non-serving cell;
a location of the wireless device in relation to the non-serving cell;
historical data on activity of the wireless device;
a radio resource control state of the wireless device;
an indication of whether the wireless device is operating in an idle state or in connected state;
an indication of whether the wireless device is operating in a discontinuous reception mode of operation;
an amount of time that has elapsed since the wireless device was last configured with a measurement gap configuration;
an amount of time that has elapsed since the wireless device was last configured with an extended measurement gap; and
information received from one or more other nodes in the cellular communications network.

* * * * *